United States Patent
Kim et al.

(10) Patent No.: US 12,444,157 B2
(45) Date of Patent: Oct. 14, 2025

(54) DEVICE, SYSTEM, AND METHOD TO PROVIDE FRONT-FACING CAMERA IMAGES IDENTIFIED USING A SCENE IMAGE ASSEMBLED FROM REAR-FACING CAMERA IMAGES

(71) Applicant: MOTOROLA SOLUTIONS, INC., Chicago, IL (US)

(72) Inventors: John Kim, Urbana, IL (US); Duane Groves, Champaign, IL (US); Sruti Kamarajugadda, Bloomington, IL (US); Craig A. Ibbotson, Urbana, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 456 days.

(21) Appl. No.: 18/117,715

(22) Filed: Mar. 6, 2023

(65) Prior Publication Data
US 2024/0303954 A1 Sep. 12, 2024

(51) Int. Cl.
*G06V 10/25* (2022.01)
*G06F 3/14* (2006.01)
(Continued)

(52) U.S. Cl.
CPC ............. *G06V 10/25* (2022.01); *G06F 3/14* (2013.01); *G06T 5/50* (2013.01); *G06V 10/761* (2022.01);
(Continued)

(58) Field of Classification Search
CPC .. G06V 10/25; G06V 10/761; G06V 2201/07; G06F 3/14; G06T 5/50; G06T 2207/20221; G06T 11/00
See application file for complete search history.

(56) References Cited

U.S. PATENT DOCUMENTS

| 8,989,700 B2 | 3/2015 | Cordero et al. |
| 9,584,735 B2 | 2/2017 | Diaz et al. |
| (Continued) | | |

FOREIGN PATENT DOCUMENTS

FR    3131675 A1 *  7/2023  ....... H04N 21/21805

*Primary Examiner* — Mekonen T Bekele
(74) *Attorney, Agent, or Firm* — PERRY + CURRIER INC.

(57) ABSTRACT

A device, system, and method to provide front-facing camera images identified using a scene image assembled from rear-facing camera images is provided. A device retrieves dual-sensor camera images having respective metadata indicating image acquisitions substantially matching a time and a place associated with an incident, the dual-sensor camera images including a front and rear-facing camera image acquired via a same respective dual-sensor camera. The device assembles the rear-facing camera images into a scene image and renders the scene image at a display screen. The device receives an indication of a region-of-interest within the scene image and responsively: identifies a set of rear-facing camera images acquired within a predetermined threshold distance of the region-of-interest as determined using the respective metadata; and renders, at the display screen, front-facing camera images, from the dual-sensor camera images, associated with the set of rear-facing camera images acquired within the predetermined threshold distance of the region-of-interest.

20 Claims, 13 Drawing Sheets

(51) Int. Cl.
   *G06T 5/50* (2006.01)
   *G06V 10/74* (2022.01)

(52) U.S. Cl.
   CPC ............... *G06T 2207/20221* (2013.01); *G06V 2201/07* (2022.01)

(56) References Cited

U.S. PATENT DOCUMENTS

| | | |
|---|---|---|
| 9,883,370 B2 | 1/2018 | Kerning et al. |
| 2014/0146202 A1* | 5/2014 | Boss ................... H04N 5/2621 348/231.99 |
| 2021/0158049 A1 | 5/2021 | Lappann et al. |

* cited by examiner

DEVICE, SYSTEM, AND METHOD TO PROVIDE FRONT-FACING CAMERA IMAGES IDENTIFIED USING A SCENE IMAGE ASSEMBLED FROM REAR-FACING CAMERA IMAGES

BACKGROUND OF THE INVENTION

Data collection for public-safety incidents often follows an occurrence of a public safety incident, which may lead to a loss of critical data that may be used to resolve a public safety incident, such as identifying suspects, witnesses, and the like. For example, such critical data may be available to the general public, but collecting such data from the general public can be time-consuming and an inefficient use of processing resources and/or bandwidth. Alternatively, and/or in addition, when such data from the general public is available (e.g., the images of an incident are provided by the public), sorting through such data may be challenging and may also lead to inefficient use of processing resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
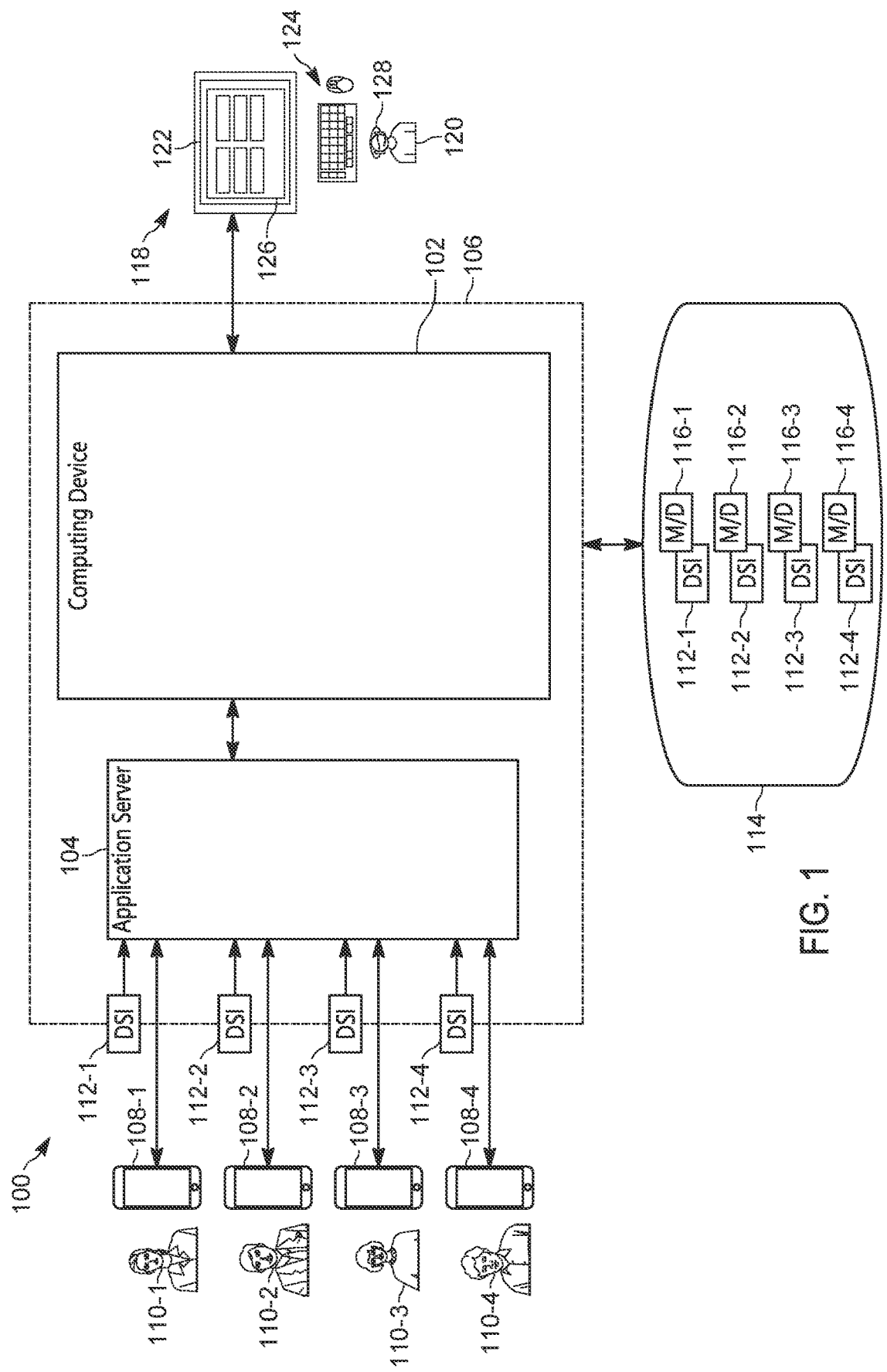
FIG. 1 is a system to provide front-facing camera images identified using a scene image assembled from rear-facing camera images, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Data collection for public-safety incidents often follows an occurrence of a public safety incident, which may lead to a loss of critical data that may be used to resolve a public safety incident, such as identifying suspects, witnesses, and the like. For example, such critical data may be available to the general public, but collecting such data from the general public can be time-consuming and an inefficient use of processing resources and/or bandwidth. Alternatively, and/or in addition, when such data from the general public is available (e.g., the images of an incident are provided by the public), sorting through such data may be challenging and may also lead to inefficient use of processing resources. For example, camera images may be useful in identifying suspects associated with a public-safety incident and/or witnesses to the public-safety incident. In particular, some cameras, such as cell phones and/or mobile devices configured as cameras, may be configured to acquire dual-sensor camera images that may show both a suspect, or other particulars of a public-safety incident, (e.g., by way of a rear-facing camera image) and a witness (e.g., by way of a front-facing camera image). Nonetheless, sorting through such dual-sensor camera images may lead to inefficient use of processing resources and/or bandwidth, and may generally provide challenges in identifying relevant camera sensor images associated with a public-safety incident. Thus, there exists a need for an improved technical method, device, and system to provide front-facing camera images identified using a scene image assembled from rear-facing camera images.

Hence, provided herein is a device, system, and method to provide improved techniques for identifying front-facing camera images using a scene image assembled from rear-facing camera images. The various images may be associated with an incident. In particular, hereafter, the term "incident" is understood to refer to a public-safety incident and/or any other suitable type of incident for which data may be collected, for example to identify details of the incident, such as suspects and/or witnesses thereof. For example, the term "incident" may include incidents that are public-safety incidents (e.g., police incidents, fire incidents, medical incidents, and the like), and/or incidents that are not public-safety incidents (e.g., parties, concerts, sporting events, and the like). Hence, while public-safety incidents are used as examples hereafter, it is understood that such examples may be adapted for incidents that are not public-safety incidents (which may also be critical in resolving public-safety incidents), though it is further understood that collection of data for non-public-safety incidents from the general public may provide particular technical challenges.

As provided herein, a computing device may have access to, or be enabled to collect, dual-sensor camera images acquired by dual-sensor cameras, each of the dual-sensor camera images having respective metadata indicating image acquisitions substantially matching a time and a place associated with an incident, and each of the dual-sensor camera images including a front-facing camera image and a rear-facing camera image acquired via a same respective dual-sensor camera.

It is understood that rear-facing camera images may comprise images taken facing away from a user operating a dual-sensor camera, while front-facing camera images may comprise images taken facing a user operating a dual-sensor camera. Put another way, the rear-facing camera images may include images of an incident, while the front-facing camera images may include images of witnesses to the incident.

The computing device may retrieve the dual-sensor camera images from a memory and/or database, and/or the computing device may retrieve the dual-sensor camera images from the dual-sensor cameras, for example via an application server, or the like, which may be in more direct communication with the dual-sensor cameras. In some instances, the computing device and the application server may be combined into one computing device.

The computing device may assemble the rear-facing camera images, from the dual-sensor camera images, into an at least partially overlapping scene image associated with the incident (hereafter interchangeably referred to as the scene image), for example to provide a 360° view and/or a panorama view of the incident, or the like. For example, at least two of the rear-facing camera images may at least partially overlap and may be combined into one scene image: however, other rear-facing camera images that do not overlap may be additionally or alternatively assembled into the scene image. Hence while the scene image may not provide a complete 360° view and/or a complete panorama view of the incident, the scene image may provide a wider view of the incident than a single rear-facing camera image, and/or the scene image may provide portions of a 360° scene image and/or a panorama scene image that, together, provide a wider view of the incident than a single rear-facing camera image.

The scene image may be rendered at a display screen, for example at a computer terminal operated by public-safety personnel, or the like.

The computing device may receive, via an input associated with the computing device (e.g., via an input device at the computer terminal), an indication of a region-of-interest within the at least partially overlapping scene image. For example, a portion of the scene image may be selected via the input. In particular, the scene image may include metadata (e.g., which may include, but is not limited to, the respective metadata of the rear-facing camera images used to assemble the scene image) that identifies geographic locations associated with regions of the scene image and/or that identifies rear-facing camera images associated with the regions, such that, when a region-of-interest is selected, the associated rear-facing camera images may be identified as well as associated front-facing camera images.

The computing device may, responsive to receiving the indication of the region-of-interest, identify the rear-facing camera images acquired within a predetermined threshold distance of the region-of-interest. For example, the scene image may include a region that depicts a suspect associated with the incident, and such a region may be selected as a region-of-interest. The computing device may identify rear-facing camera images acquired within a predetermined threshold distance of a geographic location associated with the region. For example, the predetermined threshold distance may comprise a distance from the geographic location associated with the region, and rear-facing camera images associated with locations within the predetermined threshold distance may be identified from the metadata of the scene image and/or the respective metadata associated with the rear-facing camera images.

Also responsive to receiving the indication of the region-of-interest, the computing device may render, at the display screen, front-facing camera images, from the dual-sensor camera images, associated with the rear-facing camera images acquired within the predetermined threshold distance of the region-of-interest. Such front-facing camera images may identify witnesses to the incident.

Hence, details of the incident, such as a suspect, may be efficiently identified from the scene image, and witnesses to the incident may be efficiently identified from the front-facing camera images associated with the region-of-interest.

Indeed, in some instances, the respective metadata may indicate names, addresses, phone numbers, and/or any other suitable identifying information of the witnesses, which may be provided with the front-facing camera images.

Furthermore, in some instances, the dual-sensor camera images may be associated with, and/or may include, audio data, which may be provided with the front-facing camera images.

An aspect of the present specification provides a method comprising: retrieving, via a computing device, dual-sensor camera images acquired by dual-sensor cameras, each of the dual-sensor camera images having respective metadata indicating image acquisitions substantially matching a time and a place associated with an incident, and each of the dual-sensor camera images including a front-facing camera image and a rear-facing camera image acquired via a same respective dual-sensor camera: assembling, via the computing device, rear-facing camera images, from the dual-sensor camera images, into an at least partially overlapping scene image associated with the incident: rendering, via the computing device, at a display screen, the at least partially overlapping scene image: receiving, via an input associated with the computing device, an indication of a region-of-interest within the at least partially overlapping scene image; and responsive to receiving the indication: identifying, via the computing device, a set of rear-facing camera images, from the dual-sensor camera images, acquired within a predetermined threshold distance of the region-of-interest as determined using the respective metadata; and rendering, via the computing device, at the display screen, front-facing camera images, from the dual-sensor camera images, associated with the set of rear-facing camera images acquired within the predetermined threshold distance of the region-of-interest.

Another aspect of the present specification provides a device comprising: a communication interface; and a controller communicatively coupled to the communication interface, a display screen, and an input device, the controller configured to: retrieve, via the communication interface, dual-sensor camera images, acquired by dual-sensor cameras, each of the dual-sensor camera images having respective metadata indicating image acquisitions substantially matching a time and a place associated with an incident, and each of the dual-sensor camera images including a front-facing camera image and a rear-facing camera image acquired via a same respective dual-sensor camera: assemble rear-facing camera images, from the dual-sensor camera images, into an at least partially overlapping scene image associated with the incident: render, at the display screen, the at least partially overlapping scene image: receive, via the input device, an indication of a region-of-interest within the at least partially overlapping scene image; and responsive to receiving the indication: identify a set of rear-facing camera images, from the dual-sensor camera images, acquired within a predetermined threshold distance of the region-of-interest as determined using the respective metadata; and render, at the display screen, front-facing camera images, from the dual-sensor camera images, associated with the set of rear-facing camera images acquired within the predetermined threshold distance of the region-of-interest.

Each of the above-mentioned aspects will be discussed in more detail below, starting with an example system and device architectures of the system, in which the embodiments may be practiced, followed by an illustration of processing blocks for achieving an improved technical method, device, and system to provide front-facing camera images identified using a scene image assembled from rear-facing camera images.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and, likewise, various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus, provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 to provide front-facing camera images identified using a scene image assembled from rear-facing camera images. The various components of the system 100 are in communication via any suitable combination of wired and/or wireless communication links, and communication links between components of the system 100 are depicted in FIG. 1, and throughout the present specification, as double-ended arrows between respective components: the communication links may include any suitable combination of wireless and/or wired links and/or wireless and/or wired communication networks, or the like.

The system 100 comprises a computing device 102, which may be in communication with an application server 104, or the like. In some examples, the functionality of the computing device 102 and the application server 104 may be combined into one computing device 106 (e.g., depicted in dashed lines indicating that such a combination may be optional).

The computing device 102, the application server 104, and/or the computing device 106 may comprise any suitable combination of one or more servers, one or more cloud computing devices, or the like. For example, the computing device 102 may comprise one or more servers, one or more cloud computing devices, or the like, which may assemble dual-sensor camera images into an at least partially overlapping scene image associated with an incident, as described herein. Similarly, the application server 104 may comprise one or more servers, one or more cloud computing devices, or the like, which may be in communication with a plurality of dual-sensor cameras 108-1, 108-2, 108-3, 108-4 operated by respective users 110-1, 110-2, 110-3, 110-4.

For simplicity, the dual-sensor cameras 108-1, 108-2, 108-3, 108-4 are interchangeably referred to hereafter, collectively, as the dual-sensor cameras 108 and/or cameras 108 and, generically, as a dual-sensor camera 108 and/or a camera 108. This convention will be used elsewhere in the present specification. For example, the users 110-1, 110-2, 110-3, 110-4 are interchangeably referred to hereafter, collectively, as the users 110 and, generically, as a user 110.

As depicted, the dual-sensor cameras 108 are depicted in the form of cell phones, mobile devices, or the like, however the dual-sensor cameras 108 may be provided in any suitable format that has functionality as described herein. As will be described with reference to FIG. 2, each of the dual-sensor cameras 108 include a rear-facing camera and a front-facing camera.

Furthermore, one or more of the dual-sensor cameras 108 may comprise respective microphones, for example for recording audio.

Furthermore, while four dual-sensor cameras 108 and users 110 are depicted, the system 100 may comprise as few as two dual-sensor cameras 108 and respective users 110, or more than four dual-sensor cameras 108 and respective users 110, such as tens, hundreds, or thousands of dual-sensor cameras 108 and respective users 110.

The application server 104 may collect and/or receive respective dual-sensor camera images 112-1, 112-2, 112-3, 112-4 (e.g., dual-sensor camera images 112 and/or a dual-sensor camera image 112, and labelled "DSI" in FIG. 1) from the dual-sensor cameras 108 and provide the dual-sensor camera images 112 to the computing device 102. Alternatively, and/or in addition, the dual-sensor camera images 112 may be stored at one or more memories 114 (interchangeably referred to hereafter as the memory 114, for simplicity), which may be in communication with one or more of the computing device 102, the application server 104, and/or the computing device 106. Hence, the computing device 102 may receive the dual-sensor camera images 112 from the dual-sensor cameras 108 via the application server 104, and/or the computing device 102 may receive the dual-sensor camera images 112 from the memory 114. The memory 114 may be provided in the form of a database (as depicted).

As depicted, the dual-sensor camera images 112 are being provided by the dual-sensor cameras 108 and are further depicted as being stored at the memory 114. Furthermore, at the memory 114, the dual-sensor camera images 112 are depicted with respective metadata 116-1, 116-2, 116-3, 116-4 (referred to herein collectively as respective metadata 116 and/or metadata 116, and generically as a set of respective metadata 116 and/or a set of metadata 116, though a particular set of respective metadata 116 may also be referred to as respective metadata 116 and/or metadata 116; the metadata 116 is labelled "M/D" in FIG. 1). While, for simplicity, the metadata 116 is not depicted at the dual-sensor camera images 112 provided by the dual-sensor cameras 108, the metadata 116 is nonetheless understood to be present and provided by the dual-sensor cameras 108.

The respective metadata 116 may include, but is not limited to, a time and place indicating an image acquisition: for example, a time and place indicating an image acquisition may include a time, date, and Global Position System (GPS) coordinates, or the like, at which a respective dual-sensor camera image 112 was acquired. In particular, the place may comprise a location, in GPS coordinates, or the like, at which a dual-sensor camera 108 was located when a respective dual-sensor camera image 112 was acquired.

In some examples, the respective metadata 116 may also indicate a direction or directions that a dual-sensor camera 108 was pointing when a dual-sensor camera image 112 was acquired (e.g., based on movement of the dual-sensor camera 108 prior to a dual-sensor camera image 112 being acquired).

In any case, it is understood that a dual-sensor camera 108 includes components and/or functionality for determining a time and place at which a dual-sensor camera image 112 is acquired (e.g., a clock, such as a clock of a processor, and a GPS device, and/or components to determine locations using triangulation techniques, or the like).

The respective metadata 116 may alternatively include respective names and/or network addresses and/or email addresses and/or phone numbers and/or home addresses of respective users 110. In particular, a user 110 may register with the application server 104, or the like, to provide dual-sensor camera images 112 for incidents, and may indicate and/or give permission as to what information may be included in respective metadata 116.

As depicted, the computing device 102 (and/or the computing device 106) is in communication with a computer terminal 118 operated by an operator 120, who may be a public-safety agency employee, or the like, and/or any other suitable non-public-safety agency employee, or the like. In some examples, the computer terminal 118 may be a component of a public-safety answering point (PSAP), such as a 911 call center, or the like, which may receive calls reporting incidents. Indeed, in some examples, the computing device 102 may be a component of the PSAP and may alternatively implement PSAP related functionality that may include, but is not limited to, receiving 911 calls, generating incident reports that may include a time and place of an incident, communicating with communication devices of public-safety personnel, for example to dispatch such public-safety officers and/or personnel to incidents, or the like, and/or placing calls to communication devices of witnesses, or the like.

While the computer terminal 118 is depicted in a particular format, the computer terminal 118 may be implemented in any suitable format including, but not limited to, a personal computer, a laptop, a mobile device, or the like. In some examples, functionality of the computing device 102 (and/or the computing device 106) may be combined with the computer terminal 118.

As depicted, the computer terminal 118 comprises a display screen 122 and an input device 124 (e.g., such as a keyboard and a pointing device, as depicted, and/or any other combination of suitable input devices). In general, the display screen 122 and the input device 124 may be used to interact with the computer terminal 118, for example via an interface 126 provided at the display screen 122, or the like. In particular, the input device 124 may be used to provide input to the computer terminal 118. The computer terminal 118 may further comprise a headset 128 worn by the operator 120; the headset 128 may also comprise an input device, for example used to provide audio commands as input to the computer terminal 118. However, the headset 128 may also be used to communicate with communications devices (not depicted) of public-safety officers and/or personnel (e.g., police officers, fire fighters, emergency medical technicians, or the like), for example to dispatch such public-safety officers and/or personnel to a location of an incident and/or to provide details of the incident to such communication devices (e.g., such as by providing the dual-sensor camera images 112 and/or the metadata 116, and/or portions thereof, as described in more detail with respect to FIG. 13). Alternatively, and/or in addition, the headset 128 may be used to place calls to a communication device of a witness, such as a dual-sensor camera 108 of a user 110, for example when a dual-sensor camera 108 is in the form of a cell phone, or the like.

Figure 2:
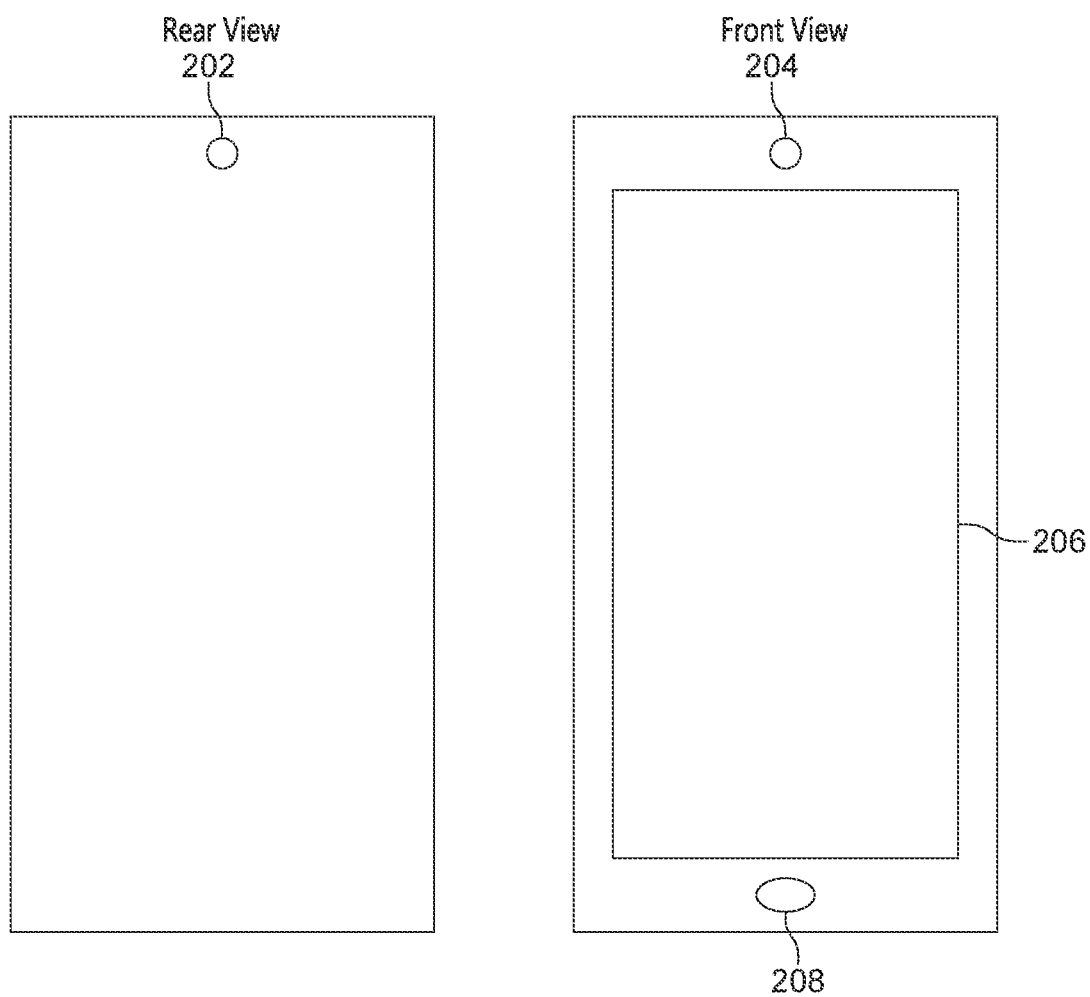
FIG. 2 depicts a rear and front view of a dual-sensor camera, having a rear-facing camera and a front-facing camera, according to non-limiting examples.

Attention is next directed to FIG. 2, which depicts rear and front views of an example dual-sensor camera 108 provided in the form of a cell phone, mobile device, or the like. The dual-sensor camera 108 includes a rear-facing camera 202 (as seen in the rear view) and a front-facing camera 204 (as seen in the front view). The cameras 202, 204 as depicted are generally understood to include respective one or more lenses and respective image sensors for acquiring images, which may collectively be referred to as dual-sensor. Put another way, a dual-sensor camera 108 is understood to include two and/or dual image sensors. While only external components of the cameras 202, 204 are depicted (e.g., an external lens, and the like), internal components such as the respective image sensors, are nonetheless understood to be present. As depicted in the front view, the dual-camera sensor 108 may include a display screen 206, which may be used to view images from the rear-facing camera 202 and/or the front-facing camera 204 before and after image acquisition, for example, to frame and/or adjust an image, or the like.

In general, it is understood that a respective user 110 may generally operate the dual-sensor camera 108 via the display screen 206, and hence the front-facing camera 204 is generally pointed towards the respective user 110 so that the display screen 206 may be viewed by the respective user 110. Conversely, the rear-facing camera 402 is generally pointed in an opposite direction, away from the respective user 110. As such, the display screen 206 and the front-facing camera 204 are understood to be located at a front of the dual-sensor camera 108 and/or a user-facing side of the dual-sensor camera 108, and the rear-facing camera 202 is located at a rear of the dual-sensor camera 108, and/or at a user-opposite side of the dual-sensor camera 108.

While only one rear-facing camera 202 and one front-facing camera 204 are depicted, it is understood that the dual-sensor camera 108 may include more than one rear-facing camera 202 and/or more than one front-facing camera 204, for example to acquire respective images at different focal lengths, or the like.

For completeness, the dual-sensor camera 108 is depicted with a speaker/microphone 208 for providing audio communication functionality, for example when the dual-sensor camera 108 is operated as a cell phone. While, for simplicity, the speaker/microphone 208 is depicted as being combined, the speaker/microphone 208 may be provided as separate devices.

The display screen 206 may further include a touch screen, which may be used to operate the dual-sensor camera 108 to acquire dual-sensor camera images 112. For example, the dual-sensor camera 108 may process an application, which causes a rear-facing camera image and a front-facing camera image to be respectively acquired by the rear-facing camera 202 and the front-facing camera 204 simultaneously. Put another way, a dual-sensor camera image 112 as provided herein generally comprises a rear-facing camera image and a front-facing camera image acquired via a same respective dual-sensor camera 108 and generally at a substantially same time and at a substantially same place.

Figure 3:
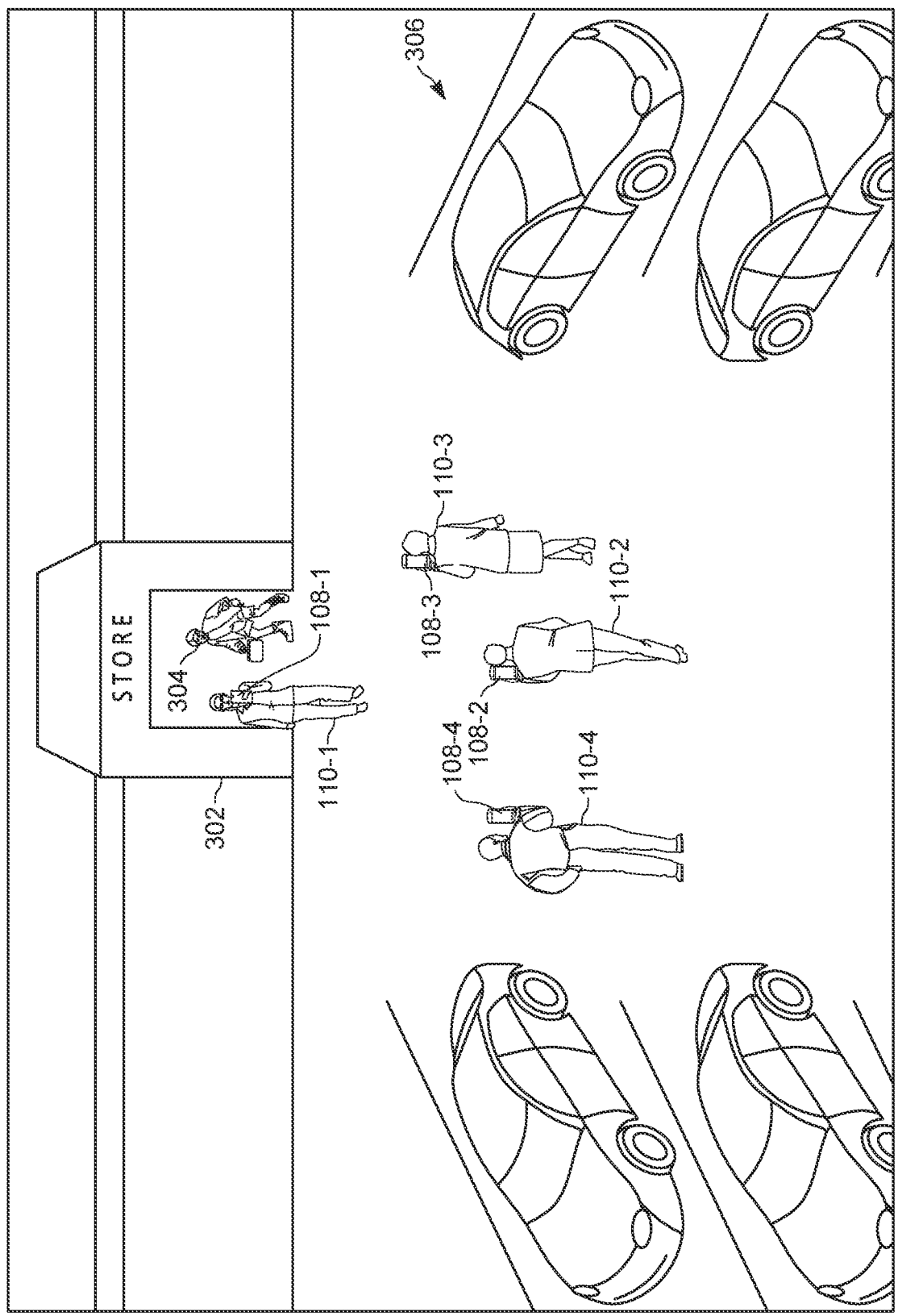
FIG. 3 depicts a public-safety incident with members of the general public operating dual-sensor cameras to collect dual-sensor camera images, in accordance with some examples.
Figure 4:
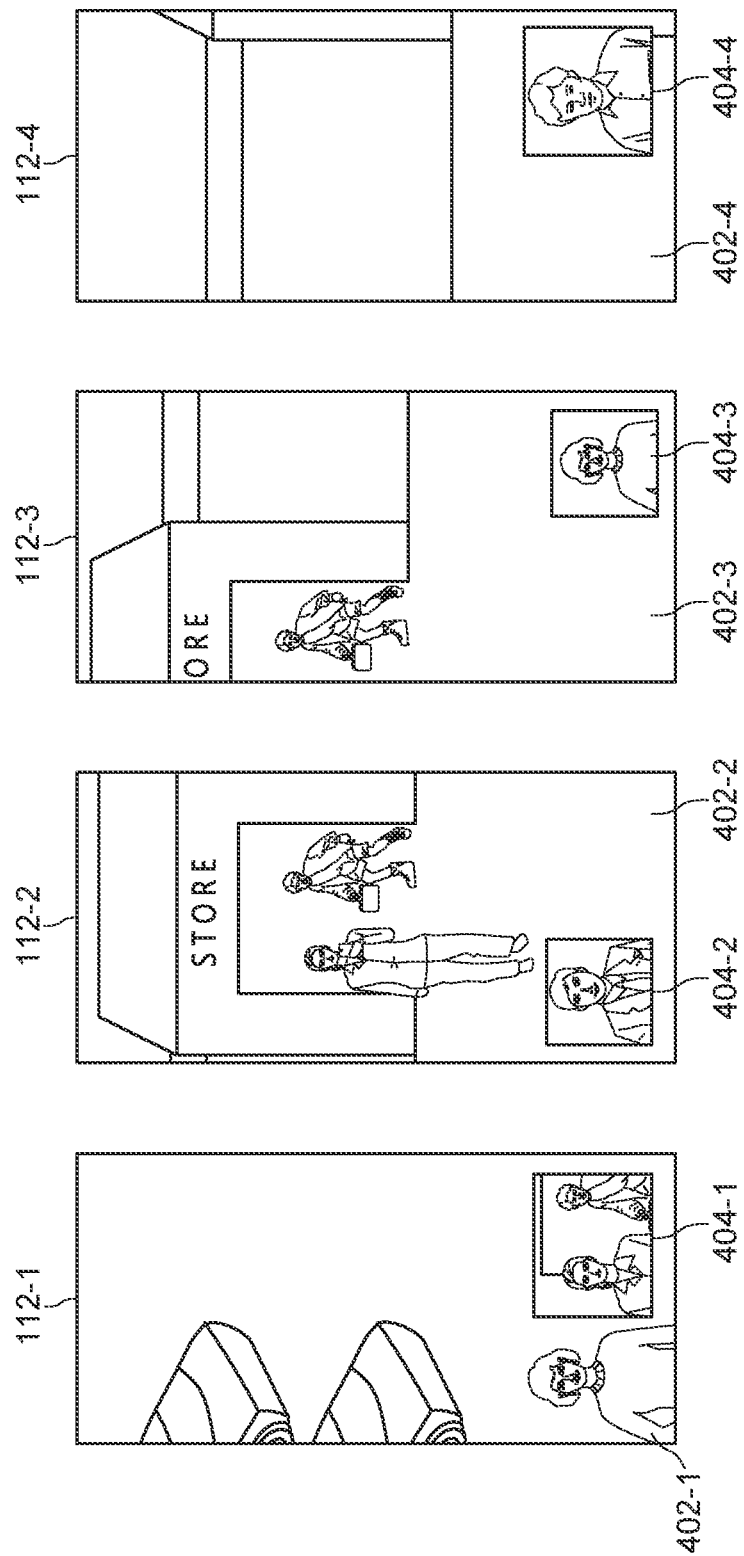
FIG. 4 depicts dual-sensor camera images, according to non-limiting examples.

For example, attention is next directed to FIG. 3 and FIG. 4, which respectively depict: the dual-sensor cameras 108 and the users 110 at a location of an incident; and dual-sensor camera images 112 acquired by the dual-sensor cameras 108 at the location of the incident.

With attention first directed to FIG. 3, the users 110 are understood to be located at or near a store 302, with a suspect 304 exiting the store 302 with allegedly stolen goods (e.g., in a bag carried by the suspect 304, and the like). Each of the users 110 are understood to be operating their respective dual-sensor cameras 108 to acquire respective dual-sensor images 112. While, for simplicity, respective cameras 202, 204 of the dual-sensor cameras 108 are not labelled in FIG. 3, they are nonetheless understood to be present.

As depicted, the user 110-1 is facing away from the store 302 and the suspect 304, and operating the dual-sensor camera 108-1 such that its respective rear-facing camera 202 is facing away from the store 302 and the suspect 304, for example towards a parking lot 306 of the store 302, and its respective front-facing camera 204 is facing towards the user 110-1 (e.g., and the store 302 and the suspect 304).

As further depicted, the users 110-2, 110-3 are located in front of the store 302 in the parking lot 306 and are facing towards the store 302 and the suspect 304 (e.g., and the user 110-1), and operating respective dual-sensor cameras 108-2, 108-3 such that their respective rear-facing cameras 202 are facing towards the store 302 and the suspect 304 (e.g., and the user 110-1), and their respective front-facing cameras 204 are facing away from the store 302 and the suspect 304, for example towards the respective users 110-2, 110-3.

As still further depicted, the user 110-4 is located in front of, but to a side of, the store 302 and is facing towards an area to a side of the store 302 and operating the dual-sensor camera 108-4 such that its respective rear-facing camera 202 is facing towards the area to the side of the store 302, and its respective front-facing camera 204 is facing towards the user 110-4.

With reference to FIG. 4, each of the depicted dual-sensor camera images 112 are understood to have been acquired as described with reference to FIG. 3. Furthermore, each of the depicted dual-sensor camera images 112 comprises a respective rear-facing camera image 402-1, 402-2, 402-3, 402-4 (referred to herein collectively as the rear-facing camera images 402, and/or generically as a rear-facing camera image 402), and a respective front-facing camera image 404-1, 404-2, 404-3, 404-4 (referred to herein collectively as the front-facing camera images 404, and/or generically as a front-facing camera image 404).

For example, the dual-sensor camera image 112-1, acquired by the dual-sensor camera 108-1 as described above with reference to FIG. 3, comprises: (i) a rear-facing camera image 402-1 of the parking lot 306 and a portion of the user 110-3 and (ii) a front-facing camera image 404-1 of a face of the user 110-1 and a portion of the suspect 304 and the store 302.

Similarly, the dual-sensor camera image 112-2, acquired by the dual-sensor camera 108-2 as described above with reference to FIG. 3, comprises: (i) a rear-facing camera image 402-2 of the user 110-1 and a portion of the suspect 304 and the store 302 and (ii) a front-facing camera image 404-2 of a face of the user 110-2.

Similarly, the dual-sensor camera image 112-3, acquired by the dual-sensor camera 108-3 as described above with reference to FIG. 3, comprises: (i) a rear-facing camera image 402-3 of a portion of the suspect 304 and the store 302 and (ii) a front-facing camera image 404-3 of a face of the user 110-3.

Similarly, the dual-sensor camera image 112-4, acquired by the dual-sensor camera 108-4 as described above with reference to FIG. 3, comprises: (i) a rear-facing camera image 402-4 of an area to the side of the store 302 (e.g., including a side of the store 302) and (ii) a front-facing camera image 404-4 of a face of the user 110-4.

In the depicted example, the rear-facing camera images 402-2, 402-3 at least partially overlap, for example showing different portions of the store 302 and the suspect 304. Further in the depicted example, the rear-facing camera images 402-3, 402-4 at least partially overlap, for example showing different portions of the store 302 (e.g., both the rear-facing camera images 402-3, 402-4 include a side of the store 302).

However, in the depicted example, the rear-facing camera image 402-1 does not overlap with any of the rear-facing camera images 402-2, 402-3, 402-4.

It is further understood that the dual-sensor camera images 112 include the respective metadata 116 described herein.

In particular, the respective metadata 116 associated with the dual-sensor camera images 112 indicate a location at which a respective dual-sensor camera image 112 was acquired (e.g., a location of a respective dual-sensor camera 108 that acquired a dual-sensor camera image 112).

In general, the computing device 102 is configured to receive the dual-sensor camera images 112 and assemble the rear-facing camera images 402 of the dual-sensor camera images 112 into an at least partially overlapping scene image associated with the incident depicted in FIG. 3. Such assembly may be based on locations at which the dual-sensor camera images 112 were acquired, a direction in which the rear-facing camera images 402 were acquired (e.g., a direction in which a respective dual-sensor camera 108 was oriented when a respective dual-sensor camera image 112 was acquired), and/or features of the rear-facing camera images 402. For example, the computing device 102 may arrange the rear-facing camera images 402 according to respective GPS coordinates at which they were acquired, and/or directions in which the rear-facing camera images 402 were acquired, and stitch together the rear-facing camera images 402 based on features, which appear in two (or more) of the rear-facing camera images 402, such as features of the store 302 and/or suspect 304 in the rear-facing camera images 402.

The at least partially overlapping scene image may comprise at least a partial 360° scene image and/or at least a partial panorama scene image that has a wider view of the incident than individual rear-facing camera images 402. However, the at least partially overlapping scene image may be in any suitable format.

Furthermore, the computing device 102 may embed, in the at least partially overlapping scene image, metadata indicating respective rear-facing camera images 402 and/or dual-sensor camera images 112 from which regions of the at least partially overlapping scene image were generated, and/or such metadata may include respective locations (e.g., indicated via GPS data, or the like) associated with the regions (e.g., as determined via the respective metadata 116).

Such embedded metadata may include the locations at which the dual-sensor camera images 112 were acquired as determined from the respective metadata 116 and/or an average thereof. For example, as both the dual-sensor images 112-2, 112-3 include the suspect 304, a location embedded in the at least partially overlapping scene image to indicate an associated location of the suspect 304 may comprise an average of respective GPS coordinates at which the dual-sensor images 112-2, 112-3 were acquired, as determined from respective metadata 116-2, 116-3.

Alternatively, and/or in addition, such embedded metadata may include estimated locations of features in the at least partially overlapping scene image, for example estimated from the respective metadata 116. For example, a set of respective metadata 116 may include a focal length, or the like, of a rear-facing camera 402 and/or other information that enables the computing device 102 to estimate a distance and angle of features in a rear-facing camera image 402 from a location at which a rear-facing camera image 402 was acquired. Such estimations may hence enable the computing device 102 (e.g., using vector-related calculations) to determine a location (e.g., in GPS coordinates) of features and/or regions of the at least partially overlapping scene image. In a particular example, using the rear-facing camera image 402-2 and the respective metadata 116-2, the computing device 102 may determine the GPS coordinates of the dual-sensor camera 108-2, a distance (e.g., 3 meters) of the suspect 304 from the GPS coordinates of the dual-sensor camera 108-2, and an angle (e.g., 20 degrees) of the suspect 304 from a center of the rear-facing camera image 402-2, which may enable the computing device 102 to determine the GPS coordinates of the suspect 304. Such estimations may be performed using numerical algorithms and/or using one or more machine-learning algorithms.

In some examples, when a feature of the rear-facing camera images 402 also appears in one or more front-facing camera images 404, locations in respective metadata 116 associated with the one or more front-facing camera images 404 may also be used as metadata indicating associated locations that may be embedded in the at least partially overlapping scene image. For example, because the suspect 304 also appears in the front-facing camera image 404-1, the location information in the metadata 116-1 that is associated with the front-facing camera image 404-1 can be included in the metadata of the scene image and may be associated with a particular region of the scene image (e.g., a region of the scene image that includes the suspect 304).

The computing device 102 may render the at least partially overlapping scene image at the display screen 122 such that a region-of-interest of the at least partially overlapping scene image may be selected via the input device 124, or the like. For example, the computing device 102 may receive an indication of a region-of-interest selected via the input device 124, such as a region of the at least partially overlapping scene image that includes the suspect 304.

The region-of-interest may take various forms. In some examples, the region-of-interest may be a single pixel selected via the input device 124 from the at least partially overlapping scene image. In other examples, the region-of-interest may be an area having a predefined size, such as a predefined number of pixels in a predefined shape surrounding a single pixel selected via the input device 124 from the at least partially overlapping scene image. Still in other examples, the region-of-interest may be a region corresponding to the entirety of a particular rear-facing camera image 402 that was assembled into the scene image, and the particular rear-facing camera image 402 may be selected based on a selection of a pixel in the particular rear-facing camera image 402 by the input device 124. However, it is understood that these examples are merely illustrative and that the region-of-interest may take various other suitable forms and may be selected in various other suitable manners.

In response to receiving the indication, the computing device 102 may identify a set of the rear-facing camera images 402 that were acquired within a predetermined threshold distance of the region-of-interest as determined using the respective metadata. For example, when the region-of-interest of the at least partially overlapping scene image includes the suspect 304, any rear-facing camera images 402 acquired within a predetermined threshold distance (e.g., 5 meters, 10 meters, 20 meters, amongst other possibilities) may be identified from the respective metadata 116 associated with the dual-sensor camera images 112. The predetermined threshold distance may be measured from an average of the associated locations at which the rear-facing camera images 402 that include the suspect 304 were captured, as described herein, and/or the predetermined threshold distance may be from an estimated location of the suspect 304, as described herein.

Also responsive to receiving the indication, the computing device 102 may render, at the display screen 122, front-facing camera images 404, from the dual-sensor camera images 112, associated with the identified set of rear-facing camera images 402 acquired within the predetermined threshold distance of the region-of-interest. Put another way, the front-facing camera images 404 acquired from the same dual-sensor camera images 112 as the rear-facing camera images 402 that were acquired within the predetermined threshold distance of the region-of-interest are identified and rendered at the display screen 122.

Advantageously, by identifying the rear-facing camera images 402 acquired within a predetermined threshold distance of the region-of-interest, and rendering associated front-facing camera images 404, which generally include images of the users 110, potential witnesses to the incident may be identified.

In some instances, the respective metadata 116 associated with the dual-sensor camera images 112 and/or specifically associated with the rear-facing camera images 402 acquired within the predetermined threshold distance of the region-of-interest may also be rendered at the display screen 122, and when such respective metadata 116 includes a telephone number, and/or other network address, of a user 110 associated with a respective dual-sensor camera image 112, the telephone number, or the like, may be used to contact the user 110, for example via a respective dual-sensor camera 108 having cell phone functionality, or the like.

Furthermore, in some instances, one or more of the dual-sensor camera images 112 may be associated with, and/or may include, audio data recorded by a respective dual-sensor camera 108 while a dual-sensor image 112 is being acquired, which may be provided with the front-facing camera images 404. For example, the computer terminal 118 may play the audio data for the operator 120 through the headset 128 while rendering the front-facing camera images 404 at the display screen 122. Such audio data may include further information about the incident.

Figure 5:
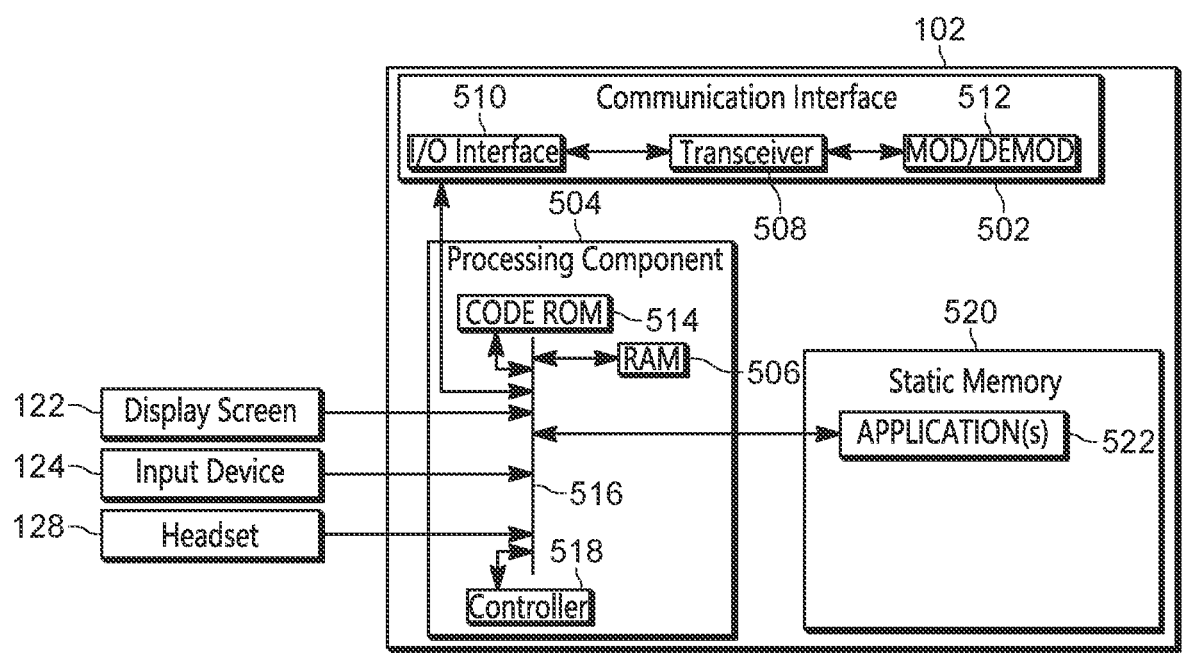
FIG. 5 is a device diagram showing a device structure of a computing device to provide front-facing camera images identified using a scene image assembled from rear-facing camera images, in accordance with some examples.

Attention is next directed to FIG. 5, which depicts a schematic block diagram of an example of the computing device 102. While the computing device 102 is depicted in FIG. 5 as a single component, functionality of the computing device 102 may be distributed among a plurality of components including, but not limited to, any suitable combination of one or more servers, one or more cloud computing devices, or the like. In some examples, a portion of the functionality of the computing device 102 may be integrated with application server 104 and/or the computing device 106 and/or the computer terminal 118.

As depicted, the computing device 102 comprises: a communication interface 502, a processing unit 504, a Random-Access Memory (RAM) 506, one or more wireless transceivers 508 (e.g., which may be optional), one or more wired and/or wireless input/output (I/O) interfaces 510, a combined modulator/demodulator 512, a code Read Only Memory (ROM) 514, a common data and address bus 516, a controller 518, and a static memory 520 storing at least one application 522. Hereafter, the at least one application 522 will be interchangeably referred to as the application 522. Furthermore, while the memories 506, 514 are depicted as having a particular structure and/or configuration, (e.g., separate RAM 506 and ROM 514), memory of the computing device 102 may have any suitable structure and/or configuration. While not depicted, the memory 520 may be at least partially combined with the memory 114 such that a portion of the dual-sensor camera images 112 may be stored at the memory 520.

As depicted, the computing device 102 may include, and/or be in communication with, the display screen 122 and the input device 124 of the computer terminal 118, and the like, as well as the headset 128.

As shown in FIG. 5, the computing device 102 includes the communication interface 502 communicatively coupled to the common data and address bus 516 of the processing unit 504.

The processing unit 504 may include the code ROM 514 coupled to the common data and address bus 516 for storing data for initializing system components. The processing unit 504 may further include the controller 518 coupled, by the common data and address bus 516, to the RAM 506 and the static memory 520.

The communication interface 502 may include one or more wired and/or wireless I/O interfaces 510 that are configurable to communicate with other components of the system 100. For example, the communication interface 502 may include one or more wired and/or wireless transceivers 508 for communicating with other suitable components of the system 100. Hence, the one or more transceivers 508 may be adapted for communication with one or more communication links and/or communication networks used to communicate with the other components of the system 100. For example, the one or more transceivers 508 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 508 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

However, it is understood that particular types of wireless networks and/or wireless transceivers, such as a DMR network, P25 network, a TETRA network, and/or a DMR transceiver, P25 transceiver, a TETRA transceiver, may be dedicated to wireless communications with communication devices of public-responders and hence may, or may not, be present.

Furthermore, it is understood that other wireless transceivers may be used to wirelessly communicate with the dual-sensor cameras 108, or such functionality may be provided at the applications server 104; when such functionality is provided at the applications server 104, wireless transceivers at the computing device 102 may be optional.

The communication interface 502 may further include one or more wireline transceivers 508, such as an Ethernet transceiver, a USB (Universal Serial Bus) transceiver, or similar transceiver configurable to communicate via a twisted pair wire, a coaxial cable, a fiber-optic link, or a similar physical connection to a wireline network, for example to communicate with the applications server 104 and/or the memory 114. The transceiver 508 may also be coupled to a combined modulator/demodulator 512.

The controller 518 may include ports (e.g., hardware ports) for coupling to other suitable hardware components of the system 100.

The controller 518 may include one or more logic circuits, one or more processors, one or more microprocessors, one or more GPUs (Graphics Processing Units), and/or the controller 518 may include one or more ASIC (application-specific integrated circuits) and one or more FPGA (field-programmable gate arrays), and/or another electronic device. In some examples, the controller 518 and/or the computing device 102 is not a generic controller and/or a generic device, but a device specifically configured to implement functionality to provide front-facing camera images identified using a scene image assembled from rear-facing camera images. For example, in some examples, the computing device 102 and/or the controller 518 specifically comprises a computer executable engine configured to implement functionality to provide front-facing camera images identified using a scene image assembled from rear-facing camera images.

The static memory 520 comprises a non-transitory machine readable medium that stores machine readable instructions to implement one or more programs or applications. Example machine readable media include a non-volatile storage unit (e.g., Erasable Electronic Programmable Read Only Memory (EEPROM), Flash Memory) and/or a volatile storage unit (e.g., RAM). In the example of FIG. 5, programming instructions (e.g., machine readable instructions) that implement the functionality of the computing device 102 as described herein are maintained, persistently, at the memory 520 and used by the controller 518, which makes appropriate utilization of volatile storage during the execution of such programming instructions.

Figure 6:
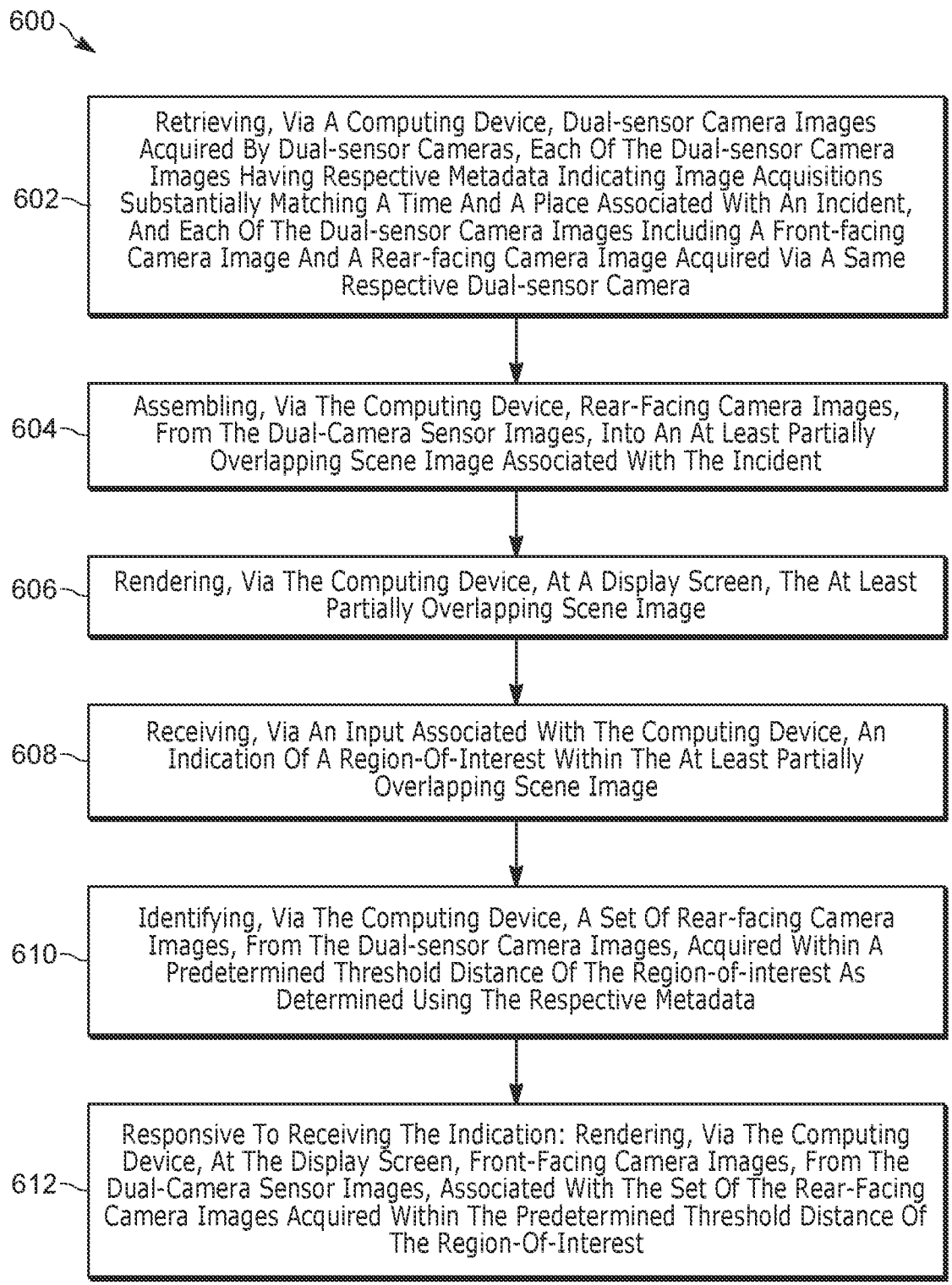
FIG. 6 is a flowchart of a method to provide front-facing camera images identified using a scene image assembled from rear-facing camera images, in accordance with some examples.

In any case, it is understood that the memory 520 stores instructions corresponding to the at least one application 522 (and/or the programming instructions 522) that, when executed by the controller 518, enables the controller 518 to implement functionality to provide front-facing camera images identified using a scene image assembled from rear-facing camera images, including, but not limited to, the blocks of the method set forth in FIG. 6.

The application 522 and/or the programming instructions 522 may include programmatic algorithms, and the like, to implement functionality as described herein.

Alternatively, and/or in addition, application 522 and/or the programming instructions 522 may include one or more machine learning algorithms that may include, but are not limited to: a deep-learning based algorithm: a neural network: a generalized linear regression algorithm: a random forest algorithm: a support vector machine algorithm: a gradient boosting regression algorithm: a decision tree algorithm: a generalized additive model: evolutionary programming algorithms; Bayesian inference algorithms, reinforcement learning algorithms, and the like. Any suitable machine learning algorithm and/or deep learning algorithm and/or neural network is within the scope of present examples.

In particular, one or more machine learning algorithms may be used to assemble the rear-facing camera images 402 into the at least partially overlapping scene image, as described herein. However, the one or more machine learning algorithms may be used to perform other functionality, as indicated below. In any case, it is understood that the one or more machine learning algorithms may be placed in a training mode to better train the one or more machine learning algorithms may be used to perform suitable functionality using positive and/or negative examples of training input and training output, that may further be scored by a user of the system 100 (e.g., such as the operator 120) and/or automatically by computing device, and the like, configured to score training input and training output.

While details of the applications server 104 and the dual-sensor cameras 108 are not depicted, the applications server 104 and the dual-sensor cameras 108 may have components similar to the computing device 102 adapted, however, for the functionality thereof.

In particular, components of the applications server 104 may be configured to implement certain functionality that is independent of the computing device 102. For example, the applications server 104 may be generally configured to instruct certain groups of the dual-sensor cameras 108 to acquire respective dual-sensor camera images 112, for example at given times, which may be shared amongst the dual-sensor cameras 108 in the group for social media purposes.

Put another way, such functionality of the applications server 104 may be borrowed by the computing device 102 for acquiring dual-sensor camera images 112 associated with an incident.

Attention is now directed to FIG. 6, which depicts a flowchart representative of a method 600 to provide front-facing camera images identified using a scene image assembled from rear-facing camera images. The operations of the method 600 of FIG. 6 correspond to machine readable instructions that are executed by the computing device 102, and specifically the controller 518 of the computing device 102. In the illustrated example, the instructions represented by the blocks of FIG. 6 are stored at the memory 520 for example, as the application 522 and/or the instructions 522. The method 600 of FIG. 6 is one way that the controller 518 and/or the computing device 102 and/or the system 100 may be configured. Furthermore, the following discussion of the method 600 of FIG. 6 will lead to a further understanding of the system 100, and its various components.

The method 600 of FIG. 6 need not be performed in the exact sequence as shown and likewise various blocks may be performed in parallel rather than in sequence. Accordingly, as described previously, the elements of method 600 are referred to herein as "blocks" rather than "steps." The method 600 of FIG. 6 may be implemented on variations of the system 100 of FIG. 1, as well.

At block 602, the controller 518, and/or the computing device 102, retrieves the dual-sensor camera images 112 (e.g., via the communication interface 502) acquired by the dual-sensor cameras 108, each of the dual-sensor camera images 112 having respective metadata 116 indicating image acquisitions substantially matching a time and a place associated with an incident, and each of the dual-sensor camera images 112 including a rear-facing camera image 402 and a front-facing camera image 404 acquired via a same respective dual-sensor camera 108.

The time and place of the incident may be determined in any suitable manner.

For instance, in examples where the computer terminal 118 is a component of a PSAP, the incident depicted in FIG. 3, and/or any other suitable incident, may be reported to the PSAP, for example via a call from one of the users 110 and/or an employee of the store 302 being robbed, or the like. An incident report may be generated by a computing device of the PSAP (which may include, but is not limited to, the computing device 102) that includes the time and the place of the incident reported by the call. Hence, in these examples, the method 600 may further comprise the controller 518 and/or the computing device 102 determining the time and the place associated with the incident by: receiving an indication of the incident that includes the time and the place, for example via a call and/or an incident report.

Alternatively, and/or in addition, the method 600 may further comprise the controller 518 and/or the computing device 102 determining the time and the place associated with the incident by: (i) receiving at least one dual-sensor camera image 112 from at least one of the dual-sensor cameras 108, (ii) identifying the incident from the at least one dual-sensor camera image, and (iii) identifying the time and the place from the respective metadata 116 associated with at least one dual-sensor camera image 112.

For example, a user 110 may be operating a respective dual-sensor camera 108 to acquire at least one dual-sensor camera image 112 which may capture an incident, and the at least one dual-sensor camera image 112 and/or at least one rear-facing camera image 402 (which may or may not be a component of a dual-sensor camera image 112) may be provided to the controller 518 and/or the computing device 102 (e.g., the user 110 may have provided permission for images from a respective dual-sensor camera 108 to be provided to the computing device 102 for the purpose of identifying incidents).

The computing device 102 may process and/or analyze the received at least one dual-sensor camera image 112 and/or at least one rear-facing camera image 402, for example using image analytics and/or one or more machine learning algorithms, to identify an incident that is occurring. And because the at least one dual-sensor camera image 112 and/or at least one rear-facing camera image 402 that is processed and/or analyzed may include respective metadata indicating a time and place that the at least one dual-sensor camera image 112 and/or at least one rear-facing camera image was acquired, the computing device 102 may use such metadata to identify the time and place of the identified incident.

In some examples, the method 600 may further comprise the controller 518 and/or the computing device 102: (i) determining the time and the place associated with the incident (e.g., using any such techniques described herein), (ii) transmitting, to the dual-sensor cameras 108, a message to acquire the dual-sensor camera images 112, and (iii) in response to transmitting the message, receiving the dual-sensor camera images 112 by receiving the dual-sensor camera images 112 from the dual-sensor cameras.

Put another way, when a time and place of an incident is determined, the computing device 102 may transmit a message to the dual-sensor cameras 108 to acquire the dual-sensor camera images 112. Such a message may be transmitted via the applications server 104. Furthermore, such a message may include the time and place of the incident, and may be transmitted to any or all dual-sensor cameras 108 with which the applications server 104 is in communication and/or any or all dual-sensor cameras 108 within a particular geographic location. For example, dual-sensor cameras 108 registered with the applications server 104 may be associated with a particular city, state, country, or continent, and the like, and the applications server 104 may transmit the message to all dual-sensor cameras 108 registered with the applications server 104 located in the same city, state, country, continent, or other defined geographic area in which the incident is located.

However, the dual-sensor cameras 108 may filter such a message based on a respective current location. For example, when a dual-sensor camera 108 is outside a given distance of the place of the incident (e.g., such as 50 m, 100 m, 200 m, 1 km, or some other distance), as determined using a GPS device, the dual-sensor camera 108 may ignore the message. However, when a dual-sensor camera 108 is within the given distance of the place of the incident (e.g., such as 50 m, 100 m, 200 m, 1 km, or some other distance), the dual-sensor camera 108 may process the message, for example by providing an instruction at a respective display screen 406 to cause a respective user 110 to operate the dual-sensor camera 108 to acquire a respective dual-sensor camera image 112 and provide the dual-sensor camera image 112 back to the computing device 102. In some examples, the given distance may be the same, or larger than, the aforementioned predetermined threshold distance.

In some examples, such a given distance may be predetermined and stored at the dual-sensor camera 108, while in other examples, such a given distance may be provided in the message, and may depend on the type of the incident. For example, when the incident is a robbery, the given distance may be 50 m, and when the incident is carjacking, the given distance may be a larger distance such as 200 m (e.g., to account for the fact that the carjacked vehicle may be moving).

In yet further examples, retrieving the dual-sensor camera images 112 may comprise retrieving the dual-sensor camera images 112 from the one or more memories 114 based on the time and the place. For example, the dual-sensor camera images 112 may have been acquired and stored at the memory 114 prior to an incident being identified, and the controller 518 and/or the computing device 102 may, when a time and place of an incident has been determined, perform a database lookup, or some other search function, using the time and place to identify dual-sensor camera images 112 having respective metadata 116 defining time and place information that substantially matches the time and place of the incident.

As used herein, the term "substantially match", as applied to times that substantially match, may include times that are within a given time period of each other (e.g., such as 1 minute, 2 minutes, 5 minutes, and/or any other suitable given time period, which may be predetermined and configured at the computing device 102, such as at the application 522). Similarly, the term "substantially match", as applied to places that substantially match, may include places that are within a given distance of each other (e.g., such as 5 m, 10 m, 50 m, and/or any other suitable given distance, which may be predetermined and configured at the computing device 102, such as at the application 522).

Hence, it is understood that the dual-sensor camera images 112 may be uploaded by the dual-sensor cameras 108 and/or the applications server 104 to the memory 114 at any suitable time and in any suitable manner, for later searching by the computing device 102.

At block 604, the controller 518 and/or the computing device 102 assembles the rear-facing camera images 402, from the dual-sensor camera images 112, into an at least partially overlapping scene image associated with the incident. An example of such an at least partially overlapping scene image is described in more detail with respect to FIG. 9.

In some examples, assembling the rear-facing camera images 402 into the at least partially overlapping scene image associated with the incident may comprise assembling the rear-facing camera images 402 side-by-side according to respective locations indicated by their respective metadata 116. For example, the respective metadata 116 may be used to identify locations at which the rear-facing camera images 402 were acquired, and rear-facing camera images 402 acquired at adjacent locations may be assembled into an order based on the adjacent locations.

Alternatively, and/or in addition, assembling the rear-facing camera images 402 into the at least partially overlapping scene image associated with the incident may comprise merging the rear-facing camera images 402 according to respective locations indicated by their respective metadata 116 to form a single image that represents the at least partially overlapping scene image. For example, at least two of the rear-facing camera images 402 that are taken at adjacent locations may be identified using their respective metadata 116, and may be merged and/or stitched together based on shared features in the rear-facing camera images 402. Such merging and/or stitched together may be performed using one or more machine learning algorithms, and the like.

Alternatively, and/or in addition, assembling the rear-facing camera images 402 into the at least partially overlapping scene image associated with the incident may comprise including respective indications of respective associated locations of regions of the at least partially overlapping scene image as metadata in the at least partially overlapping scene image. For example, metadata may be embedded into the at least partially overlapping scene image to indicate associated respective locations of regions of the at least partially overlapping scene image as described above.

As a result of such assembling, the at least partially overlapping scene image may comprise at least a partial 360° scene image and/or at least a partial panorama scene image of the incident having a wider field-of-view of the incident than any single rear-facing camera image 402. However, the at least partially overlapping scene image may be provided in any suitable format.

With brief reference to FIG. 4, it is understood that one or more of the front-facing camera images 404 may include details of the incident, such as the front-facing camera image 404-1. In these examples, such front-facing camera images 404 may be incorporated into the at least partially overlapping scene image.

At block 606, the controller 518 and/or the computing device 102 renders, at the display screen 122, the at least partially overlapping scene image, for example by controlling the display screen 122 to render the at least partially overlapping scene image.

At block 608, the controller 518 and/or the computing device 102 receives, via an input associated with the controller 518 and/or the computing device 102, an indication of a region-of-interest within the at least partially overlapping scene image. For example, the input device 124 may be used to select (e.g., "click on") a region-of-interest. Hence, in these examples, the indication may indicate a region of the at least partially overlapping scene image which has been selected using the input device 124.

Responsive to receiving the indication, at block 610, the controller 518 and/or the computing device 102 identifies a set of the rear-facing camera images 402 from the dual-sensor camera images 112, that were acquired within a predetermined threshold distance of the region-of-interest as determined using the respective metadata 116. For example, the region-of-interest may be associated with a location, as identified from metadata embedded in the at least partially overlapping scene image, and the set of rear-facing camera images 402 within the predetermined threshold distance of the location may be identified based on their associated respective metadata 116.

Also responsive to receiving the indication, at block 612, the controller 518 and/or the computing device 102 renders, at the display screen 122, any or all front-facing camera images 404, from the dual-sensor camera images 112, that are associated with the rear-facing camera images 402 identified at block 610 (i.e., the set of rear-facing camera images 402 acquired within the predetermined threshold distance of the region-of-interest).

Furthermore, the front-facing camera images 404 may be rendered at the display screen in addition to the at least partially overlapping scene image, or in place of the at least partially overlapping scene image.

In line with the discussion above in connection with FIG. 4, it is understood that such front-facing camera images 404 may include images of the users 110 who may be witnesses to the incident.

As such, the method 600 generally enables details of an incident to be quickly and efficiently identified via the at least partially overlapping scene image; the method 600 further generally enables witnesses to the incident to be quickly and efficiently identified via the front-facing camera images 404 associated with the rear-facing camera images 402 acquired within the predetermined threshold distance of the region-of-interest. As such, the method 600 may reduce use of processing resources at the computing device 102 in determining details of the incident and identifying potential witnesses to the incident.

Other features are within the scope of the present specification and/or the method 600.

For example, the method 600 may further comprise, responsive to receiving the indication, the controller 518 and/or the computing device 102 rendering at the display screen 122 the rear-facing camera images 402 acquired within the predetermined threshold distance of the region-of-interest, as determined using the respective metadata 116. In these examples, the rear-facing camera images 402 may be rendered in addition to, or in place of, the at least partially overlapping scene image.

For example, the rear-facing camera images 402, from the dual-sensor camera images 112, acquired within the predetermined threshold distance of the region-of-interest may be rendered with the front-facing camera images 404 at block 612.

In yet further examples, the method 600 may further comprise, responsive to receiving the indication, the controller 518 and/or the computing device 102 rendering at the display screen 122 one or more of respective names and/or network addresses and/or email addresses and/or phone numbers and/or home addresses of one or more respective users 110 associated with the dual-sensor camera images 112 acquired within the predetermined threshold distance of the region-of-interest, as determined using the respective metadata 116. In such examples, respective names and/or network addresses and/or email addresses and/or phone numbers and/or home addresses of one or more respective users 110 may be determined from the respective metadata 116 and may assist with initiating communications with the one or more respective users 110. Hence, potential witnesses to the incident may be quickly and efficiently identified and contacted. Indeed, in examples where network addresses and/or email addresses and/or phone numbers are identified and/or rendered, the method 600 may further comprise initiating one or more of a message or a call to a communication device (e.g., a dual-sensor camera 108) associated with an identified user 110 who may be a potential witness.

In yet further examples, the dual-sensor camera images 112 may be associated with, and/or may comprise, respective audio data, and the method 600 may further comprise, responsive to receiving the indication, playing, via the computing device 102, at a speaker (e.g., of the headset 128), the respective audio data associated with the rear-facing camera images 402 acquired within the predetermined threshold distance of the region-of-interest. For example, when the region-of-interest is identified, audio data associated with the rear-facing camera images 402 may be played sequentially, and/or respective electronic buttons may be provided at the display screen 122 to play respective audio data upon actuation of a respective electronic button.

Figure 7:
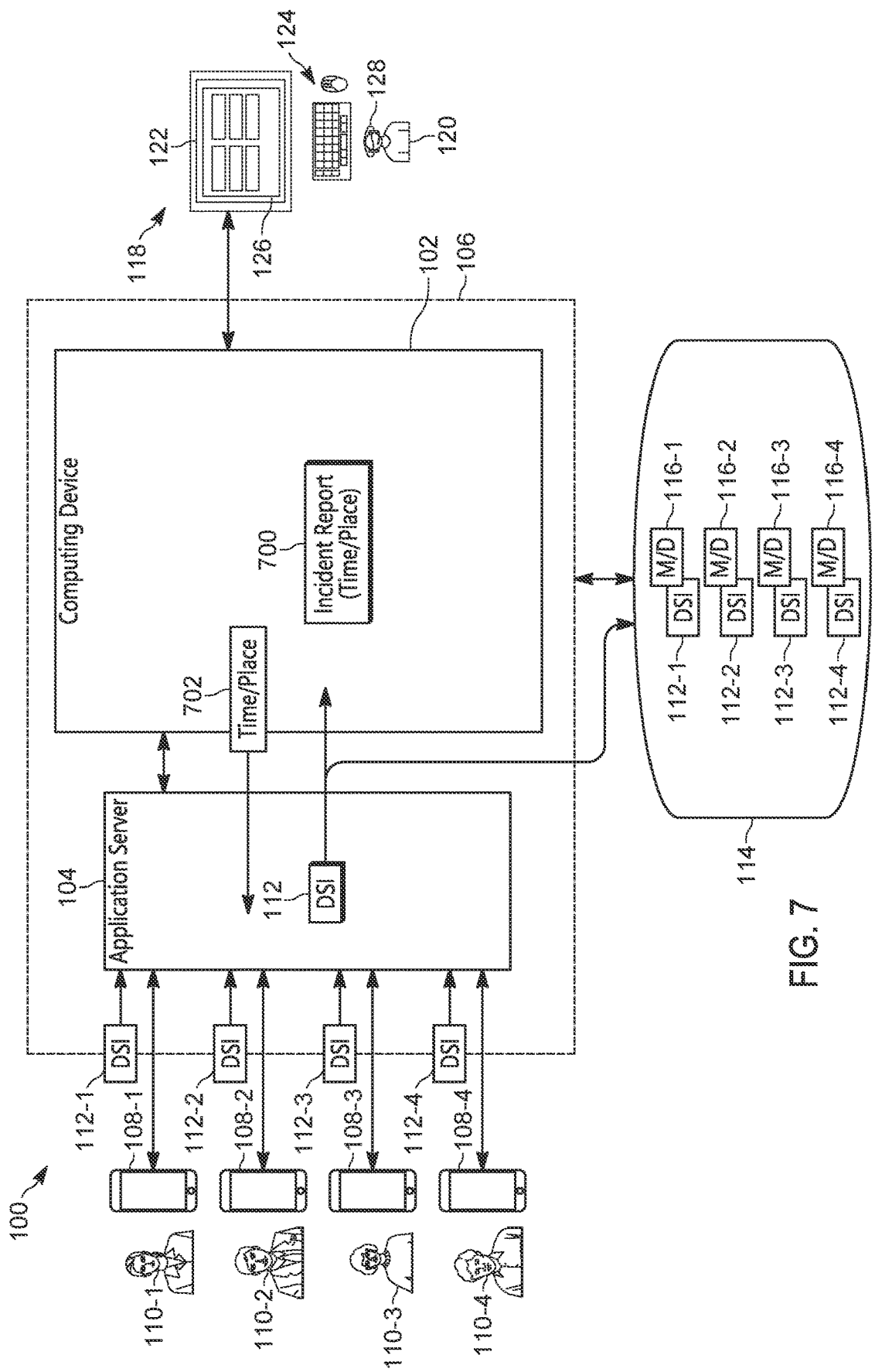
FIG. 7 depicts the system of FIG. 1 implementing aspects of a method to provide front-facing camera images identified using a scene image assembled from rear-facing camera images, in accordance with some examples.
Figure 8:
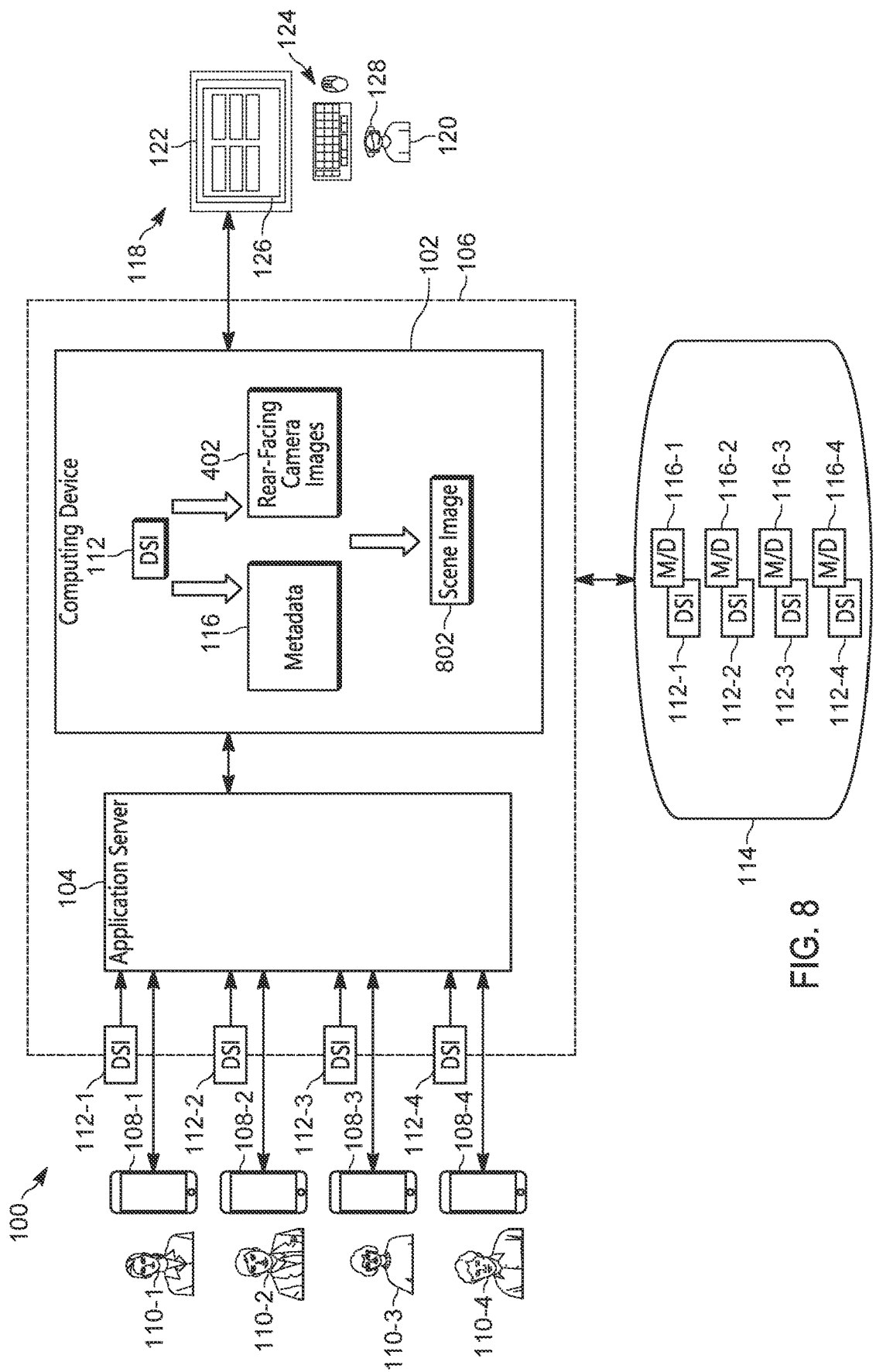
FIG. 8 depicts the system of FIG. 1 continuing to implement aspects of a method to provide front-facing camera images identified using a scene image assembled from rear-facing camera images, in accordance with some examples.
Figure 9:
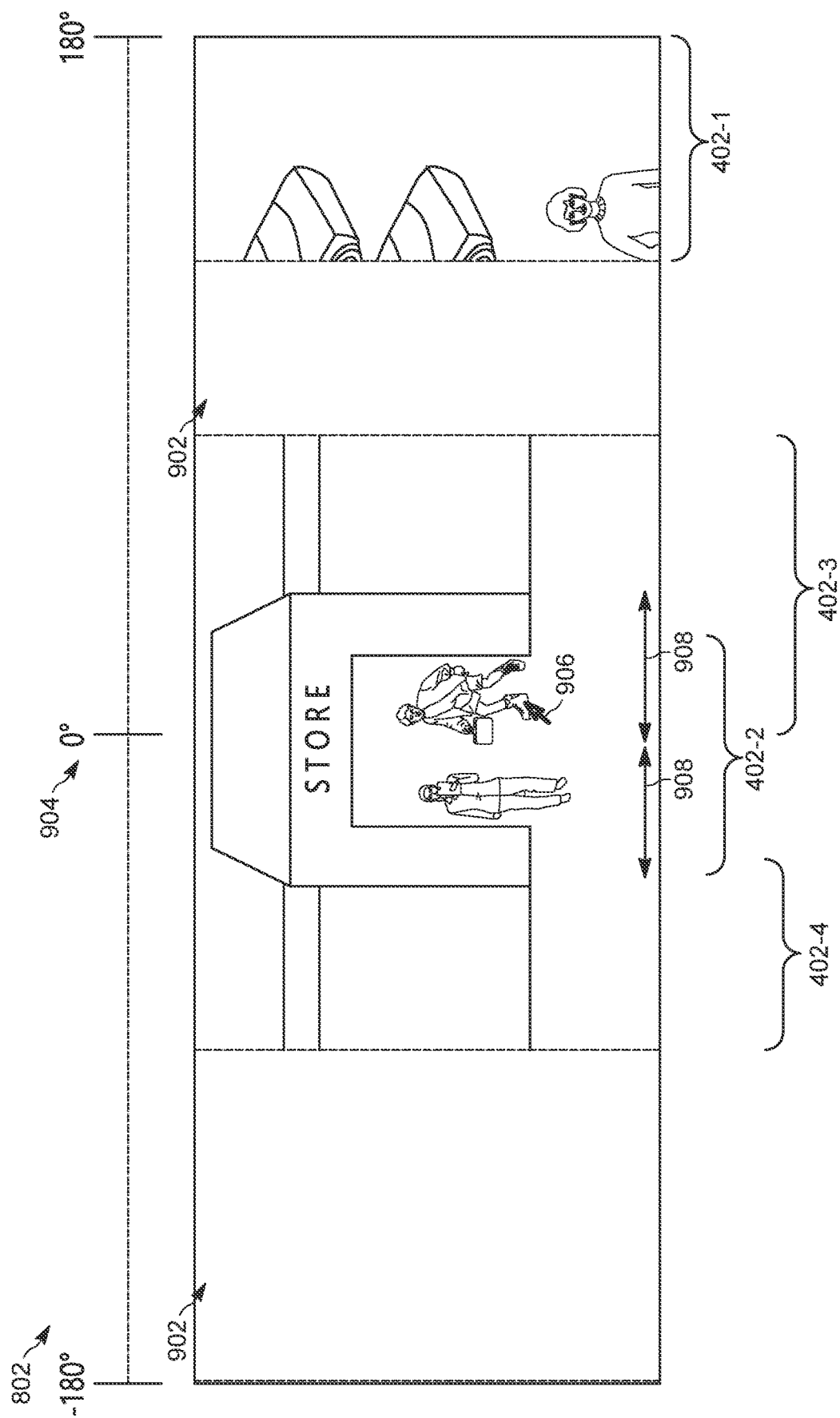
FIG. 9 depicts an example scene image, in accordance with some examples.
Figure 10:
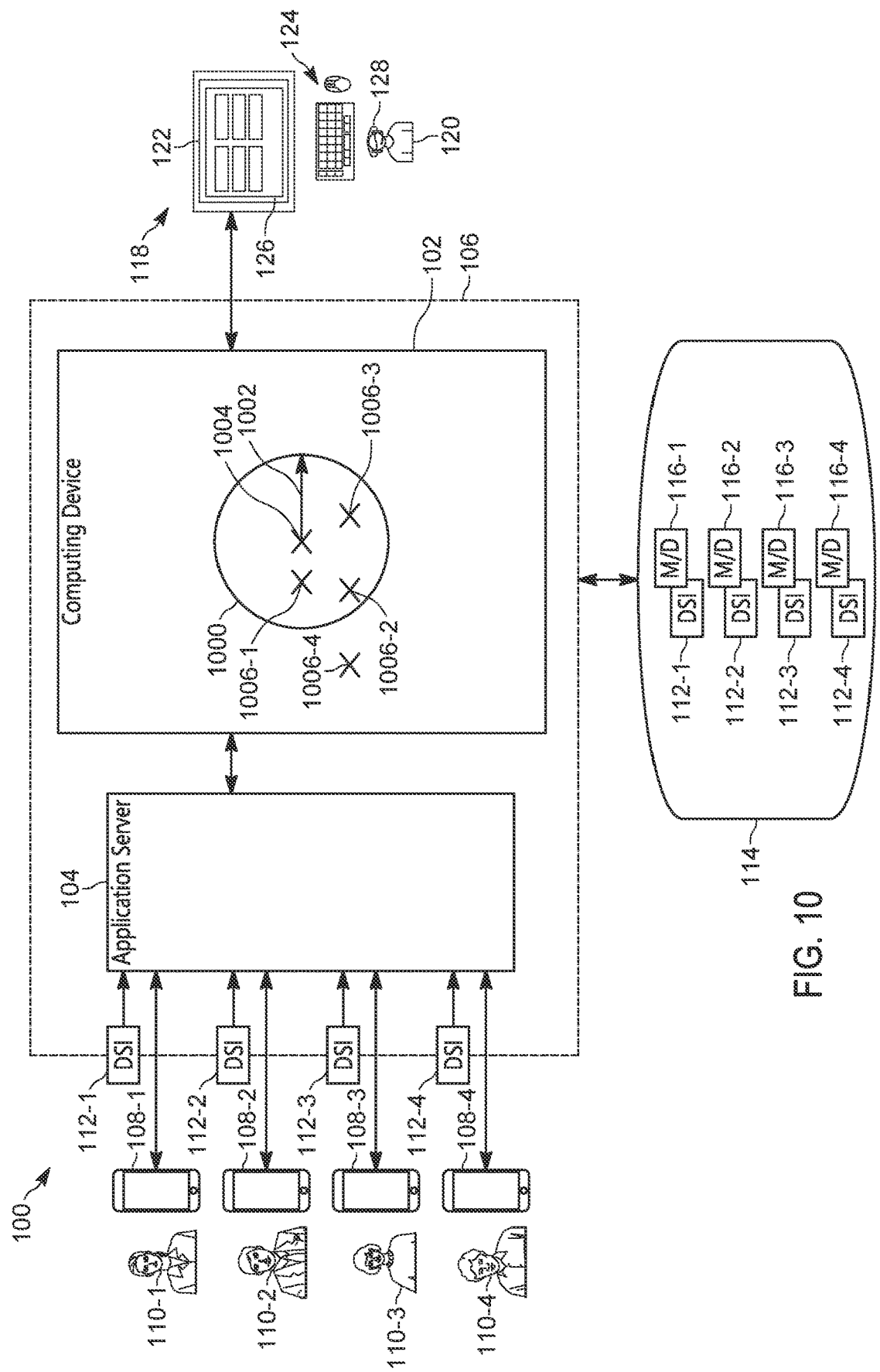
FIG. 10 depicts the system of FIG. 1 continuing to implement aspects of a method to provide front-facing camera images identified using a scene image assembled from rear-facing camera images, in accordance with some examples.
Figure 11:
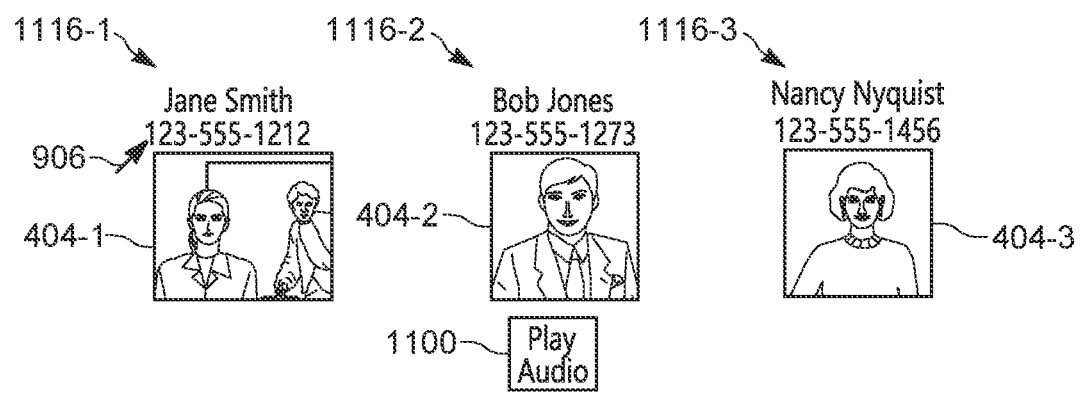
FIG. 11 depicts front-facing camera images identified using a scene image assembled from rear-facing camera images, in accordance with some examples.
Figure 12:
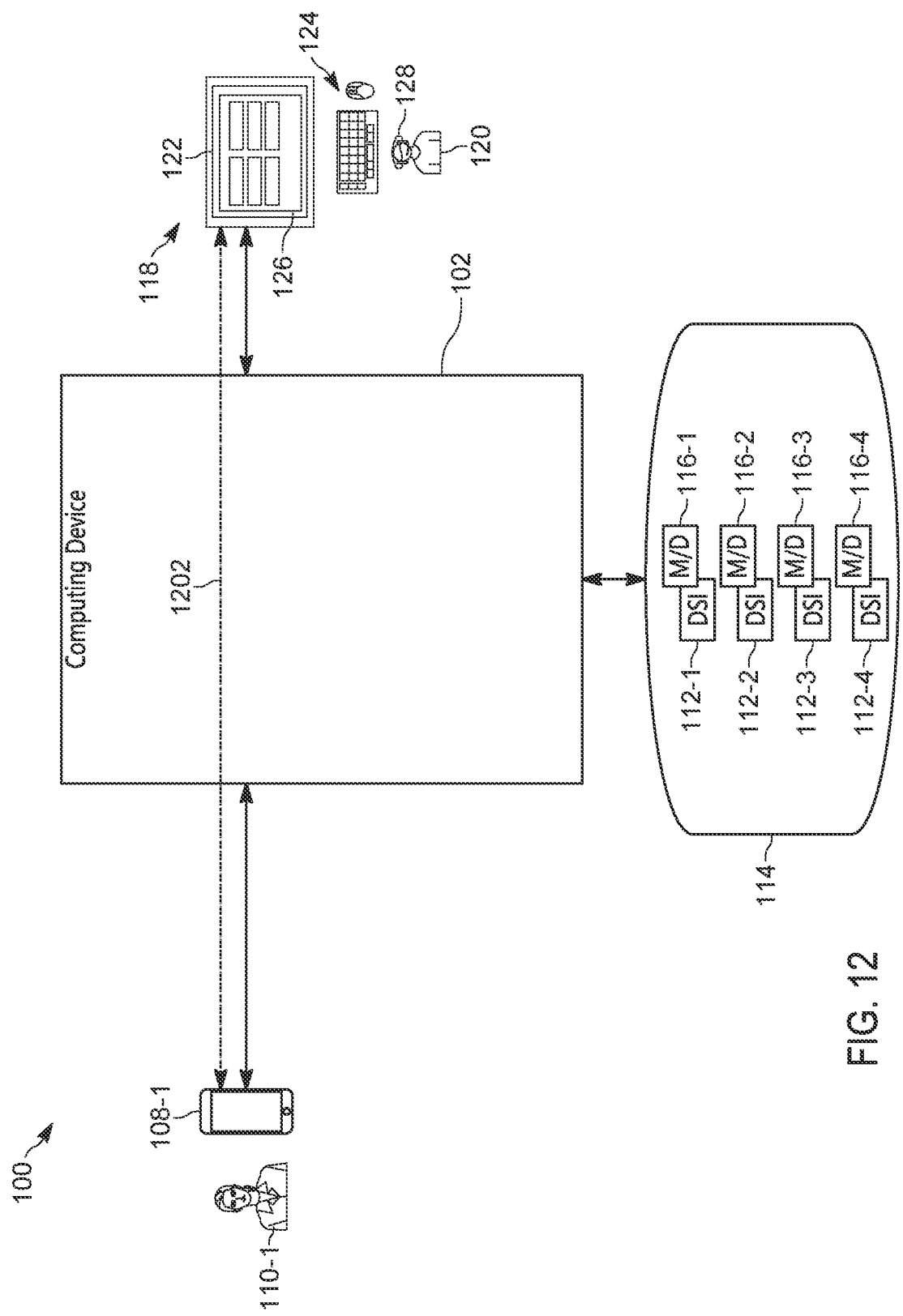
FIG. 12 depicts a portion of the system of FIG. 1 continuing to implement aspects of a method to provide front-facing camera images identified using a scene image assembled from rear-facing camera images, in accordance with some examples.
Figure 13:
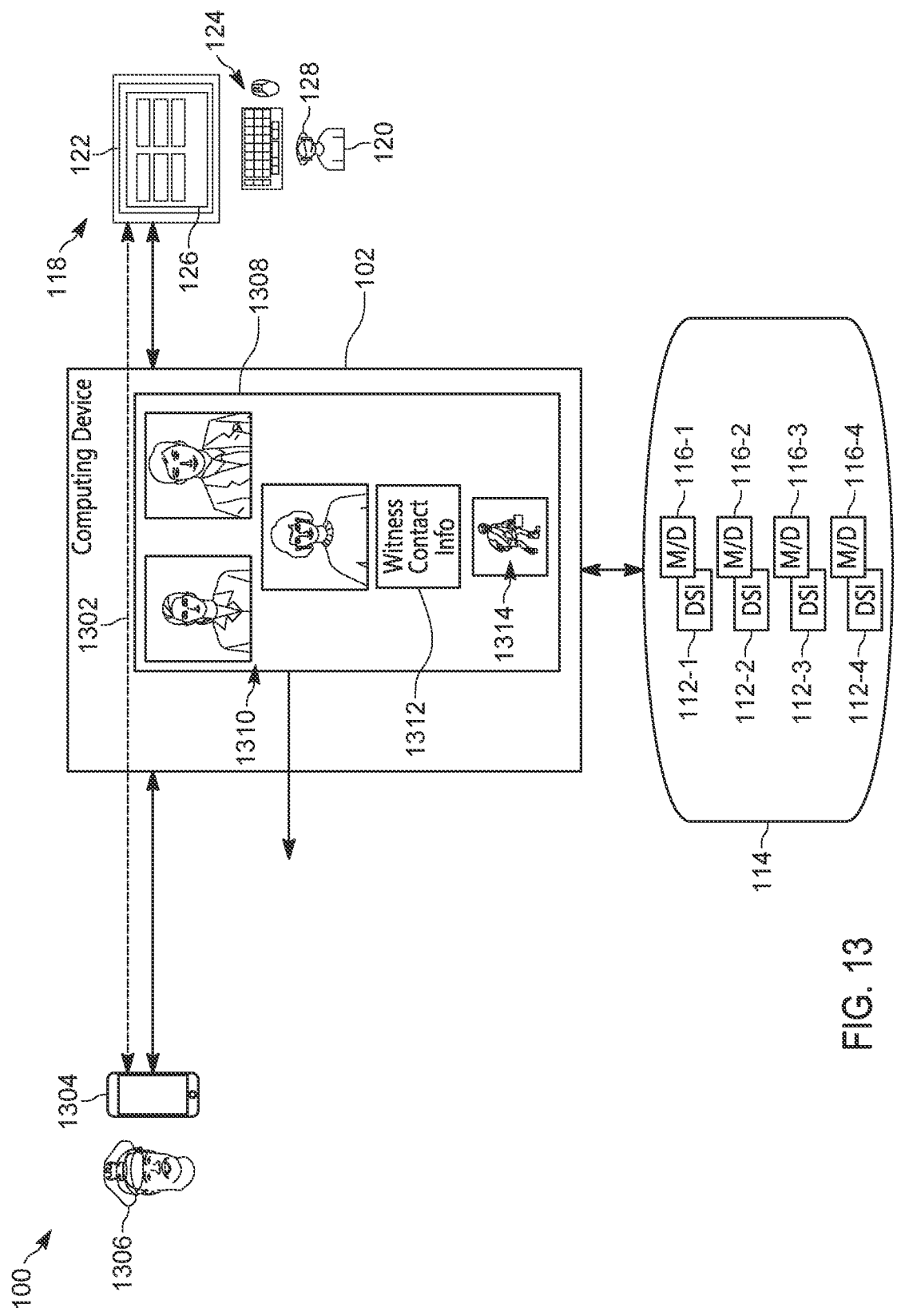
FIG. 13 depicts a portion of the system of FIG. 1 continuing to implement aspects of a method to provide front-facing camera images identified using a scene image assembled from rear-facing camera images, in accordance with some examples.

Attention is next directed to FIG. 7, FIG. 8, FIG. 9, FIG. 10, FIG. 11, FIG. 12 and FIG. 13, which depict an example of the method 600. FIG. 7, FIG. 8, FIG. 10, FIG. 11 and FIG. 12 are substantially similar to FIG. 1 with like components having like numbers (though FIG. 12 and FIG. 13 depict a portion of the system 100). FIG. 9 depicts an example of an at least partially overlapping scene image assembled at block 604, and FIG. 10 and FIG. 11, together, depict an example of block 610 and block 612 of the method 600.

Attention is next directed to FIG. 7, which depicts an incident report 700 generated (e.g., by the computing device 102 and/or another computing device, such as a PSAP related computing device) that includes a place and time of an incident, such as the incident depicted in FIG. 3. For example, the suspect 304 may have robbed the store 302, and an employee, or the like, may call 911 to report the incident and associated information including the place and time of the incident. The computing device 102 may then generate the incident report 700 based on the 911 call. For instance, based on the 911 call, the operator 120 may input the time and place information into the computer terminal 118, which may then provide the time and place information to the computing device 102 for generating the incident report 700. Alternatively, and/or in addition, the computer terminal 118 or the computing device 102 may automatically determine the time and/or place information based on a time when the 911 call was made, location data received from communication device used to place the 911 call, and/or by using a natural language processing (NLP) algorithm to automatically extract the information from the 911 call.

Also depicted in FIG. 7, a message 702 is transmitted from the computing device 102 to the dual-sensor cameras 108, the message 702 including the place and time of the incident from the incident report 700. The dual-sensor cameras 108 are understood to receive the message 702 and compare the place and time with their respective current locations and time, and, when there is a substantial match, the dual-sensor cameras 108 provide an instruction to acquire the dual-sensor camera images 112, which are transmitted to the computing device 102. Alternatively, and/or in addition, as also depicted in FIG. 7, the dual-sensor camera images 112 may be stored at the memory 114. In any case, the computing device 102 is understood to receive the dual-sensor camera images 112 (e.g., at block 602 of the method 600).

Attention is next directed to FIG. 8, which depicts the computing device 102 assembling the rear-facing camera images 402 from the dual-sensor camera images 112 into an at least partially overlapping scene image 802 (e.g., at block 604 of the method 600). As has been previously described, a portion of the metadata 116 may also be embedded in the at least partially overlapping scene image 802 to identify the rear-facing camera images 402 used to generate regions of the at least partially overlapping scene image 802 and/or locations associated with the regions of the at least partially overlapping scene image 802. For example, identifiers of the rear-facing camera images 402 used to generate regions of the at least partially overlapping scene image 802 and/or locations associated with the regions of the at least partially overlapping scene image 802, as indicated by the respective metadata 116, may be embedded in respective regions of the rear-facing camera images 402 used to generate regions of the at least partially overlapping scene image 802 and/or locations associated with the regions of the at least partially overlapping scene image 802.

Attention is next directed to FIG. 9, which depicts an example of the at least partially overlapping scene image 802, which is understood to be rendered (e.g., at block 606 of the method 600) at the display screen 122, for example at the interface 126.

As depicted, the at least partially overlapping scene image 802 comprises a panorama view of the incident, assembled from the rear-facing camera images 402-1, 402-2, 402-3, 402-4; in particular, the rear-facing camera images 402-1, 402-2, 402-3, 402-4 used to generate corresponding regions of the at least partially overlapping scene image 802 are indicated via respective brackets in FIG. 9, and it is understood from the overlapping of the brackets that at least the rear-facing camera images 402-2, 402-3, 402-4 overlap as described above.

It is further understood that sections 902 of the at least partially overlapping scene image 802 are blank, which correspond to regions not imaged by the rear-facing camera images 402.

To better indicate the wider view of the at least partially overlapping scene image 802 as compared to the rear-facing camera images 402, an angular scale 904 from −180° to 0° to +180° is provided (e.g., at the display screen 122), with the middle at "0°" selected according to a possible location of the incident represented by the at least partially overlapping scene image 802. Such an estimation may be implemented via one or more machine learning algorithms and/or in any other suitable manner. However, such an estimation is understood to be optional, as is the angular scale 904.

It is furthermore understood that the at least partially overlapping scene image 802 may be provided in any suitable format, and that the depicted panorama view is merely one example. Indeed, it is understood from FIG. 9 that a panorama view may comprise a view (e.g., an image) that is from −180° to 0° to +180°, or such a panorama view may be between any two suitable angles (e.g., +/−170°, +/−160°, amongst other possibilities), which may be a same or different numerical angle (e.g., a panorama view may extend between +/−180°, or between +180° and −170°, between +170° and −160°, amongst other possibilities).

Also depicted in FIG. 9 is an electronic pointer 906, which may be operated and/or moved via the input device 124 and used to indicate a region-of-interest within the at least partially overlapping scene image 802 (e.g., at block 608 of the method 600). For example, as depicted, the electronic pointer 906 is being used to select a region where an image of the suspect 304 is located.

Also depicted in FIG. 9 is an example of the predetermined threshold distance from the region-of-interest, represented by arrows 908. While the arrows 908 are depicted as extending side to side relative to the electronic pointer 906, it is understood that the predetermined threshold distance may indicate a radius of a circle, and hence, may extend in two (or three) dimensions from the region-of-interest. Put another way, the predetermined threshold distance is understood to encompass locations of any dual-sensor cameras 108 within a circle defined by a geographic radius extending from the region-of-interest. For example, the region-of-interest represented by the electronic pointer 906 may be associated with a geographic location, which may be estimated from the respective metadata 116, such as the geographic location of the suspect 304 as represented by GPS coordinates as had been previously described, and each of the arrows 908 may represent a distance corresponding to the geographic radius defining the predetermined threshold distance.

Alternatively, the geographic location associated with the region-of-interest may be based on one or more locations indicated by the respective metadata 116 used to generate the region-of-interest, such as an average of GPS locations from the respective metadata 116-2, 116-3 (e.g., as the region-of-interest was generated using both of the rear-facing camera images 402-2, 402-3). Hence, in these examples, when the electronic pointer 906 is used to select a region-of-interest that includes a depiction of the suspect 304, the associated geographic location of the region-of-interest may comprise an average of GPS coordinates from the respective metadata 116-2, 116-3 and/or the locations of the dual-sensor cameras 108-2, 108-3. Hence, in these examples, the predetermined threshold distance, represented by arrows 908 may extend from the average of GPS coordinates from the respective metadata 116-2, 116-3 and/or the locations of the dual-sensor cameras 108-2, 108-3.

In any case, in the depicted example, it is understood that the rear-facing camera images 402 acquired within the predetermined threshold distance of the region-of-interest include the rear-facing camera images 402-1, 402-2, 402-3, which are understood to have been acquired at respective locations located within the predetermined threshold distance. In particular, it is understood that while the rear-facing camera image 402-1 does not show the region-of-interest, the rear-facing camera image 402-1 was acquired within the predetermined threshold distance of the region-of-interest.

It is further understood that, in the depicted example, the rear-facing camera image 402-4 was not acquired within the predetermined threshold distance of the region-of-interest.

Still further, it is understood that the rear-facing camera images 402 acquired within the predetermined threshold distance of the region-of-interest may include rear-facing camera images that are not assembled into the scene image 802. For example, certain rear-facing camera images 402 may be excluded from the scene image 802 for various reasons even though their metadata 116 indicates that they were captured within the predetermined threshold distance of the region-of-interest. One such reason may be that a first rear-facing camera image 402 includes the same or similar information as a second rear-facing camera image 402 (e.g., because the first and second rear-facing camera images 402 were captured by users 110 standing near one another and pointing their dual-sensor cameras 108 in comparable directions), and so only one of the first or second rear-facing camera images 402 may be used to assemble the scene image 802. Another such reason may be that the predetermined threshold distance extends beyond the scope of the scene image 802. For instance, as noted above, in some cases (e.g., in connection with carjacking incidents), the predetermined threshold distance can be quite large, while the scene image 802 may be limited to a smaller distance surrounding the determined location of the incident.

Hence, it is understood that FIG. 9 represents a non-limiting example of identifying (e.g., at block 610 of the method 600) the rear-facing camera images 402 acquired within a predetermined threshold distance of the region-of-interest as determined using the respective metadata.

For a further example of block 610 of the method 600, attention is next directed to FIG. 10, which depicts the computing device 102 generating a circle 1000 having a radius 1002 corresponding to the predetermined threshold distance, with a center 1004 of the circle 1000 corresponding to the location associated with the selected region-of-interest (e.g., as depicted an estimated geographic location of the suspect 304). Indications 1006-1, 1006-2, 1006-3, 1006-4 of locations at which the rear-facing camera images 402-1, 402-2, 402-3, 402-4 were acquired are also indicated. As depicted, the indications 1006-1, 1006-2, 1006-3 are within the circle 1000 and the indication 1006-4 is outside the circle 1000. As such, it is understood that the rear-facing camera images 402-1, 402-2, 402-3 have been acquired at respective locations located within the predetermined threshold distance, while the rear-facing camera image 402-4 was acquired at a respective location outside the predetermined threshold distance.

Attention is next directed to FIG. 11, which depicts the front-facing camera images 404-1, 404-2, 404-3 associated with the rear-facing camera images 402-1, 402-2, 402-3 acquired within the predetermined threshold distance of the region-of-interest, and which are understood to be rendered at the display screen 122 (e.g., at block 612 of the method 600). While the at least partially overlapping scene image 802 is not depicted, the front-facing camera images 404-1, 404-2, 404-3 may be rendered with, or without (as depicted), the at least partially overlapping scene image 802. Similarly, while the rear-facing camera images 402-1, 402-2, 402-3 are not depicted, the rear-facing camera images 402-1, 402-2, 402-3 may be rendered with the front-facing camera images 404-1, 404-2, 404-3 (e.g., with or without the at least partially overlapping scene image 802).

As has been described herein, the front-facing camera images 404-1, 404-2, 404-3 include images of the respective users 110-1, 110-2, 110-3, which may be used to identify potential witnesses to the incident of FIG. 3. Furthermore, in some examples, the front-facing camera images 404-1, 404-2, 404-3 may be used to search the at least partially overlapping scene image 802 and/or the rear-facing camera images 402 for the witnesses. For example, the front-facing camera image 404-1 includes an image of the user 110-1, which may be used to search the at least partially overlapping scene image 802 and/or the rear-facing camera images 402 for the user 110-1, who may be found in the portion of the at least partially overlapping scene image 802 generated from the rear-facing camera image 402-1. Such an indication of the user 110-1 in the at least partially overlapping scene image 802 may show details of the user 110-1 and/or may indicate more information about what the user 110-1 may have witnessed.

Similarly, the front-facing camera image 404-3 includes an image of the user 110-3, which may be used to search the at least partially overlapping scene image 802 and/or the rear-facing camera images 402 for the user 110-3, who may be found in the portion of the at least partially overlapping scene image 802 generated from the rear-facing camera image 402-3. Such an indication of the user 110-3 in the at least partially overlapping scene image 802 may show details of the user 110-3 and/or may indicate more information about what the user 110-3 may have witnessed.

As depicted, the front-facing camera image 404-2 is depicted with an electronic button 1100, which, when actuated (e.g., via the input device 124) may cause associated audio data to be played, for example at the headset 128. Put another way, in this example the dual-sensor camera image 112-2 is understood to be associated with audio data, which may be played upon actuation of the electronic button 1100.

As depicted, the front-facing camera images 404-1, 404-2, 404-3 may be rendered with portions 1116-1, 1116-2, 1116-3 (referred to herein collectively as portions 1116 and/or generically as a portion 1116) of respective metadata 116-1, 116-2, 116-3 such as, as depicted, a respective name and a respective phone number associated with respective users 110-1, 110-2, 110-3. Furthermore, the electronic pointer 906 may be used to select a phone number, such as the phone number indicated by the portion 1116-1.

With reference to FIG. 12, which for simplicity depicts the system 100 without the applications server 104, in response to selection of the phone number indicated by the portion 1116-1, a call 1202 may be initiated by the computing device 102 between the dual-sensor camera 108-1, configured as a cell phone associated with the phone number indicated by the portion 1116-1, and the computer terminal 118, such that the operator 120 may interview the user 110-1 in relation to the incident depicted in FIG. 3.

Alternatively, or in addition, and with reference to FIG. 13, which for simplicity depicts the system 100 without the applications server 104, in some examples, a call 1302 may be initiated by the computing device 102 between the computer terminal 118 and a communication device 1304 of a public-safety officer 1306 (e.g., depicted as a police officer, but any suitable public-safety officer, or the like, are within the scope of the present specification). On the call 1302, the operator 120 may communicate with the public-safety officer 1306 regarding the incident depicted in FIG. 3. Alternatively, and/or in addition, the computing device 102 may transmit and/or provide a message 1308 to the communication device 1304 that includes information from the dual-sensor camera images 112, which may include, but is not limited to: (i) images of witnesses (e.g., the users 110-1, 110-2, 110-3) from the front-facing camera images 404 associated with the rear-facing camera images 402 acquired within the predetermined threshold distance of the region-of-interest as described herein (and/or the associated rear-facing camera images 402 themselves); (ii) a portion 1312 of the respective metadata 116 that includes any suitable witness contact information, such as names, addresses, and phone numbers associated with the images of witnesses in the message 1308; (iii) an image 1314 of the suspect 304 from the dual-sensor camera images 112; and/or (iv) any other suitable information and/or details of the incident depicted in FIG. 3. The message 1308 may include, but is not limited to, a be-on-the-lookout (e.g., a BOLO) message that includes an image of the suspect 304, which may include or exclude information related to witnesses. The message 1308 may be transmitted to one or more communication devices 1304 associated with one or more public-safety officers, or the like.

The images 1310, 1314 may be extracted from any suitable dual-sensor camera images 112 and/or the images 1310, 1314 may comprise an entirety of any of the front-facing camera images 404 associated with the rear-facing camera images 402 acquired within the predetermined threshold distance of the region-of-interest as described herein (and/or the associated rear-facing camera images 402 themselves). Indeed, the message 1308 may include any suitable combination of images and/or information from the dual-sensor camera images 112 and/or the metadata 116.

In any case, it is understood that the method 600 may include the controller 518 and/or the computing device 102: (i) extracting one or more of images and information from one or more of the dual-sensor camera images 112 and the metadata 116 and (ii) transmitting a message to a communication device (e.g., associated with a public-safety officer) that includes one or more of the extracted images and information. Alternatively, and/or in addition, is understood that the method 600 may include the controller 518 and/or the computing device 102: (i) extracting an image of a suspect from one or more of the dual-sensor camera images 112 and (ii) providing the extracted image of the suspect in one or more messages (e.g., a BOLO message) to one or more communication devices (e.g., associated with one or more public-safety officers).

Hence, the computing devices and methods provided herein may further facilitate communicating information and/or details related to an incident, for example to communication devices of public-safety officers and/or personnel.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot assemble, merge or stitch together images, cannot transmit or receive electronic messages, cannot operate machine learning algorithms, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B"

should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   retrieving, via a computing device, dual-sensor camera images acquired by dual-sensor cameras, each of the dual-sensor camera images having respective metadata indicating image acquisitions substantially matching a time and a place associated with an incident, and each of the dual-sensor camera images including a front-facing camera image and a rear-facing camera image acquired via a same respective dual-sensor camera;
   assembling, via the computing device, rear-facing camera images, from the dual-sensor camera images, into an at least partially overlapping scene image associated with the incident;
   rendering, via the computing device, at a display screen, the at least partially overlapping scene image;
   receiving, via an input associated with the computing device, an indication of a region-of-interest within the at least partially overlapping scene image; and
   responsive to receiving the indication:
      identifying, via the computing device, a set of rear-facing camera images, from the dual-sensor camera images, acquired within a predetermined threshold distance of the region-of-interest as determined using the respective metadata; and
      rendering, via the computing device, at the display screen, front-facing camera images, from the dual-sensor camera images, associated with the set of rear-facing camera images acquired within the predetermined threshold distance of the region-of-interest.

2. The method of claim 1, further comprising determining the time and the place associated with the incident by:
   receiving an indication of the incident that includes the time and the place.

3. The method of claim 1, further comprising determining the time and the place associated with the incident by:
receiving at least one dual-sensor camera image from at least one of the dual-sensor cameras;
identifying the incident based on the at the least one dual-sensor camera image; and
identifying the time and the place from the respective metadata associated with the at least one dual-sensor camera image.

4. The method of claim 1, further comprising:
determining the time and the place associated with the incident;
transmitting, to the dual-sensor cameras, a message to acquire the dual-sensor camera images; and
in response to transmitting the message, receiving the dual-sensor camera images by receiving the dual-sensor camera images from the dual-sensor cameras.

5. The method of claim 1, wherein retrieving the dual-sensor camera images comprises:
retrieving the dual-sensor camera images from one or more memories based on the time and the place.

6. The method of claim 1, wherein assembling the rear-facing camera images into the at least partially overlapping scene image associated with the incident comprises:
assembling the rear-facing camera images side-by-side according to respective locations indicated by the respective metadata.

7. The method of claim 1, wherein assembling the rear-facing camera images, into the at least partially overlapping scene image associated with the incident comprises:
merging the rear-facing camera images according to respective locations indicated by the respective metadata to form a single image that represents the at least partially overlapping scene image.

8. The method of claim 1, wherein assembling the rear-facing camera images, into the at least partially overlapping scene image associated with the incident comprises:
including respective indications of respective locations of regions of the at least partially overlapping scene image as metadata in the at least partially overlapping scene image.

9. The method of claim 1, further comprising, responsive to receiving the indication:
rendering, via the computing device and at the display screen, the set of rear-facing camera images acquired within the predetermined threshold distance of the region-of-interest, wherein the rear-facing camera images are rendered in addition to, or in place of, the at least partially overlapping scene image.

10. The method of claim 1, wherein the dual-sensor camera images are associated with respective audio data, the method further comprising, responsive to receiving the indication:
playing, via the computing device, at a speaker, the respective audio data associated with the set of rear-facing camera images acquired within the predetermined threshold distance of the region-of-interest.

11. A device comprising:
a communication interface; and
a controller communicatively coupled to the communication interface, a display screen and an input device, the controller configured to:
retrieve, via the communication interface, dual-sensor camera images acquired by dual-sensor cameras, each of the dual-sensor camera images having respective metadata indicating image acquisitions substantially matching a time and a place associated with an incident, each of the dual-sensor camera images including a front-facing camera image and a rear-facing camera image acquired via a same respective dual-sensor camera;
assemble rear-facing camera images, from the dual-sensor camera images, into an at least partially overlapping scene image associated with the incident;
render, at the display screen, the at least partially overlapping scene image;
receive, via the input device, an indication of a region-of-interest within the at least partially overlapping scene image; and
responsive to receiving the indication:
identify a set of the rear-facing camera images from the dual-sensor camera images, acquired within a predetermined threshold distance of the region-of-interest as determined using the respective metadata; and
render, at the display screen, front-facing camera images, from the dual-sensor camera images, associated with the set of the rear-facing camera images acquired within the predetermined threshold distance of the region-of-interest.

12. The device of claim 11, wherein the controller is further configured to determine the time and the place associated with the incident by:
receiving an indication of the incident that includes the time and the place.

13. The device of claim 11, wherein the controller is further configured to determine the time and the place associated with the incident by:
receiving at least one dual-sensor camera image from at least one of the dual-sensor cameras;
identifying the incident based on the at the least one dual-sensor camera image; and
identifying the time and the place from the respective metadata associated with the at least one dual-sensor camera image.

14. The device of claim 11, wherein the controller is further configured to:
determine the time and the place associated with the incident;
transmit, to the dual-sensor cameras, a message to acquire the dual-sensor camera images; and
in response to transmitting the message, receive the dual-sensor camera images by receiving the dual-sensor camera images from the dual-sensor cameras.

15. The device of claim 11, wherein the controller is further configured to retrieve the dual-sensor camera images by:
retrieving the dual-sensor camera images from one or more memories based on the time and the place.

16. The device of claim 11, wherein the controller is further configured to assemble the rear-facing camera images into the at least partially overlapping scene image associated with the incident by:
assembling the rear-facing camera images side-by-side according to respective locations indicated by the respective metadata.

17. The device of claim 11, wherein the controller is further configured to assemble the rear-facing camera images, into the at least partially overlapping scene image associated with the incident by:
merging the rear-facing camera images according to respective locations indicated by the respective metadata to form a single image that represents the at least partially overlapping scene image.

18. The device of claim 11, wherein the controller is further configured to assemble the rear-facing camera images, into the at least partially overlapping scene image associated with the incident by:
including respective indications of respective locations of regions of the at least partially overlapping scene image as metadata in the at least partially overlapping scene image.

19. The device of claim 11, wherein the controller is further configured to, responsive to receiving the indication:
render, at the display screen, the set of rear-facing camera images acquired within the predetermined threshold distance of the region-of-interest, wherein the rear-facing camera images are rendered in addition to, or in place of, the at least partially overlapping scene image.

20. The device of claim 11, wherein the dual-sensor camera images are associated with respective audio data, and the controller is further configured to, responsive to receiving the indication:
play, at a speaker, the respective audio data associated with the rear-facing camera images acquired within the predetermined threshold distance of the region-of-interest.

* * * * *